(12) United States Patent
Roin et al.

(10) Patent No.: US 8,233,918 B2
(45) Date of Patent: Jul. 31, 2012

(54) DIGITAL CONTENT DISTRIBUTION SYSTEM FOR DELIVERING LOCATION SPECIFIC CONTENT TO AN AD HOC GROUP OF MOBILE SUBSCRIBERS

(75) Inventors: Lloyd A. Roin, North Aurora, IL (US); Nathan G. Hoffberg, St. Charles, IL (US); Daniel O. Gruber, Grayslake, IL (US); Edwin D. Layman, Chicago, IL (US); Richard J. Penn, Grand Rapids, MI (US); Keith J. Tomo, Allendale, MI (US)

(73) Assignee: E-View Connections LLC, Naperville, IL (US)

( * ) Notice: Subject to any disclaimer, the term of this patent is extended or adjusted under 35 U.S.C. 154(b) by 298 days.

(21) Appl. No.: 12/583,445

(22) Filed: Aug. 20, 2009

(65) Prior Publication Data
US 2011/0045847 A1 Feb. 24, 2011

(51) Int. Cl.
*H04Q 7/20* (2006.01)
(52) U.S. Cl. ............... 455/456.3; 455/456.1; 455/456.2; 455/457; 455/433; 455/67.12; 455/518; 455/519; 455/521; 455/66.1; 455/67.11; 379/37; 379/38; 370/352
(58) Field of Classification Search ............... 455/404.1, 455/418, 404.2, 466, 457, 456.3, 456.1, 456.2, 455/433; 340/7.5, 825.49, 539.13; 379/37, 379/38; 370/352
See application file for complete search history.

(56) References Cited

U.S. PATENT DOCUMENTS

| | | |
|---|---|---|
| 4,368,459 A | 1/1983 | Sapora |
| 4,380,759 A | 4/1983 | Sulkoski et al. |
| 5,045,833 A | 9/1991 | Smith |
| 6,493,558 B1 | 12/2002 | Bernhart et al. |
| 6,867,688 B2 | 3/2005 | Lamb |
| 7,392,038 B1 | 6/2008 | Ratschunas et al. |

(Continued)

FOREIGN PATENT DOCUMENTS

EP 0743623 11/1996

(Continued)

OTHER PUBLICATIONS

"Alerting and Communicating Devices for Deaf and Hard of Hearing Peopole—What's Available Now," http://clerccenter.gallaudet.edu/infotogo/418.html.

(Continued)

*Primary Examiner* — Patrick Edouard
*Assistant Examiner* — Fred Casca
(74) *Attorney, Agent, or Firm* — John S. Paniaguas; Katten Muchin Rosenman LLP

(57) ABSTRACT

A digital content distribution system and method are disclosed for delivering location specific content to an ad hoc group of mobile subscribers. The system consists of a downloadable application that runs on the subscribers mobile communication device and communicates with a server-based content composer system. The content composer system manages outgoing content based upon the geographic location reported by a mobile communication device application and the demographic and preference data stored in a subscriber database. Emergency alerts are sent only to subscribers in a area covered by the alert. The emergency alerts are executed on the mobile communication device even though the mobile communication device is in a low power sleep or hibernate mode. Moreover, the emergency alerts take over the mobile communications device no matter what other tasks are being executed when the emergency alert is received.

5 Claims, 26 Drawing Sheets

U.S. PATENT DOCUMENTS

| | | | |
|---|---|---|---|
| 7,441,203 | B2 | 10/2008 | Othmer et al. |
| 7,461,528 | B2 | 12/2008 | Taniguchi et al. |
| 2004/0171380 | A1 | 9/2004 | Puranik et al. |
| 2004/0242286 | A1 | 12/2004 | Benco et al. |
| 2005/0254635 | A1 | 11/2005 | Koretsky et al. |
| 2006/0276218 | A1 | 12/2006 | Goris et al. |
| 2006/0285652 | A1 | 12/2006 | McClelland et al. |
| 2006/0293850 | A1 | 12/2006 | Ahn et al. |
| 2007/0010245 | A1 | 1/2007 | Levitan |
| 2007/0116190 | A1 | 5/2007 | Bangor et al. |
| 2007/0129087 | A1* | 6/2007 | Bell .............................. 455/458 |
| 2007/0133756 | A1 | 6/2007 | Graves et al. |
| 2007/0142059 | A1 | 6/2007 | Wang |
| 2007/0191005 | A1 | 8/2007 | Hughes |
| 2007/0192409 | A1 | 8/2007 | Kleinstern et al. |
| 2007/0296575 | A1* | 12/2007 | Eisold et al. ............. 340/539.16 |
| 2008/0070546 | A1* | 3/2008 | Lee ............................ 455/404.2 |
| 2009/0163227 | A1 | 6/2009 | Collins |

FOREIGN PATENT DOCUMENTS

| | | |
|---|---|---|
| EP | 1471717 | 10/2004 |
| WO | PCTUS2010/41130 | 9/2010 |

OTHER PUBLICATIONS

"Mobile Phone for the Deaf from Vodafone," http://www.infosyncworld.com/news/n/4708.html?rfp=dta.

"Real-Time Texting for Deaf People," http://en.wikipedia.org/wiki/Telecommunications_devices_for_the_deaf.

"Telecommunications Device for the Deaf," http://en.wikipedia.org/wiki/Telecommunications_devices_for_the_deaf.

"Video Messaging for the Deaf," http://www.cs.uwc.ac.za/uploads/media/Video_Messaging_for_the_Deaf2..ppf.

TA Advancing Global Communications, Engineering manual, Oct. 2009 $5^{th}$ Edition.

TA Guidelines to the Intellectual Property Rights Policy of the Telecommunications Industry Association.

* cited by examiner

Cell Phone Software (Power Off)

DIGITAL CONTENT DISTRIBUTION SYSTEM FOR DELIVERING LOCATION SPECIFIC CONTENT TO AN AD HOC GROUP OF MOBILE SUBSCRIBERS

This application includes a Computer Listing Appendix on a compact disc entitled "COMPUTER LISTING", hereby incorporated by reference. The compact disc includes three files: namely "Eview.txt" (81,920 bytes created 09/30/2009); "EviewPrototype.txt" (552,960 bytes created 09/30/2009) and "EviewWebService.txt" (24,576 bytes created 09/30/2009).

BACKGROUND OF THE INVENTION

1. Field of the Invention

The present invention relates to a digital content distribution system and method for delivering location specific digital content to an ad hoc group of mobile subscribers based upon their current location by way of their mobile communication devices that provides location specific digital content, such as emergency information, to such ad hoc subscribers, such as, the deaf and hard of hearing, as a function of the geographic location of the subscribers.

2. Description of the Prior Art

Various systems are known for providing digital content to subscribers that are deaf or hard of hearing. Examples of such systems are disclosed in U.S. Pat. No. 6,867,688; US Patent Application Publication Nos. 2006/0276218; 2006/0285652; 2007/0010245; 2007/0116190 and European Patent Application Publication No. EP 14 71717 A3.

U.S. Pat. No. 6,867,688 B1 discloses an Apparatus and Method for Providing Weather and Other Alerts. A system is disclosed for providing "location-specific" alerts and for informing a subscriber, who may be visually or hearing impaired, of the existence and severity of the alert. However, the location specific alerts are based upon known locations of a plurality of stationary dedicated communications devices that are configured to receive messages over a wireless telecommunications network. The system utilizes multiple transmitters in different geographical areas to broadcast "location specific" content to subscribers within the broadcast range of the various transmitters. Each subscriber's location is registered with the content provider during the subscription process. Content is provided wirelessly over a cellular communication network and received by a dedicated receiver device. The system is unable to track the location of dedicated receiver device should it ever be moved from the original location reported during the subscription process.

The dedicated alert device has a microcomputer that monitors received digital messages for the presence of an alert code associated with alert messages, and a peripheral device which produces various tones and flashing lights in response to the alert device's reception of an appropriate alert message. The alert device produces high or low decibel level audible sounds and high-intensity flashing strobe light corresponding to the severity of the alerts. The alert device may be configured to support an additional alert level to be utilized for the reception of advertising messages for display on liquid crystal display.

US Patent Application Publication No. US 2006/0276218 A1 discloses a Mobile Communications Device for Text Base Messaging Over a Mobile Communications Network and a Method of Using the Same. A text based communications device is disclosed for use by hearing or speech impaired persons to transmit and receive text via a speech channel of mobile communication network. The text based communications device can be a mobile phone or a PDA. The transmitted and received text messages are displayed on two separate sections of the display.

US Patent Application Publication No. US 2006/0285652 A1 discloses a System and Method for Facilitating Communications Involving Hearing-Impaired Parties. The system includes a voice recognition system for converting voice messages to an SMS message for receipt by a hearing impaired person on a wireless device. The wireless device can be a cellular telephone or a PDA.

US Patent Application Publication No. US 2007/0010245 A1 discloses a System and Method for Operating a Private Wireless Communications System. A communication system is disclosed that is configured to send public address announcements or alerts to a deaf subscriber using SMS or MMS on a wireless subscriber unit device. The subscriber unit device can be a mobile communication device or a personal digital assistant (PDA).

US Patent Application Publication No. US 2007/0116190 A1 discloses a System and Method of Providing Access to Web-Based Voice Mail for TTY Enabled Devices. The system includes a voice recognition system for converting voice messages to text. In particular, a voice mail server translates a voice mail message into a text message and sends it to a requesting deaf subscriber. The text message is sent as an SMS via telephone network US Patent Application Publication No. US 2007/0133756 A1 discloses a Personal Notification Method and Apparatus. The system includes a central computer and a plurality of hailing devices. A subscriber registers with the notification system to be informed of announcements, changes or other information regarding an event of interest to the subscriber. The hailing devices can be pagers, mobile telephones, or personal digital assistants. The central computer transmits a general notification message to all the hailing devices for emergency messages and routine messages. Hailing devices receive the general notification message and activate the alert signals. The hailing devices can display the general notification message on their respective displays, or play the general notification message through their speakers. The travelers who may be hearing or visually impaired will sense the alert signal of their hailing device respectively, and look at the display of their hailing device for the notification message. However, the notifications are not location specific.

The regional European published patent application no. EP 1471717 A3 discloses a Portable Communication Device. Described is a cellular telephone devices arranged to operate using a mobile telecommunications network. The main body of a cellular telephone has a display on which SMS text messages and other information can be displayed. The information received on the cellular telephone device may be graphics, promotions, advertisement and fascia identification data. The fascia is adapted for use by a hearing impaired or deaf person by providing the subscriber input with a speech-to-text facility that enables a telephone text mode.

Unfortunately, none of the above mentioned systems are able to distribute location based content to mobile subscribers that are traveling away from home. As such, subscribers that are deaf or hard of hearing may be unaware of location specific emergency conditions, such as emergency weather conditions, when traveling away from home. Thus, there is a need to distribute location specific content to subscribers on an ad hoc basis as a function of their current location.

SUMMARY OF THE INVENTION

The present invention relates to a digital content distribution system and a method for delivering location specific content to an ad hoc group of mobile subscribers and method of delivering subscriber-requested, location-based content directly to a mobile communication device, such as a cell phone or personal digital assistant (PDA) or other mobile communication device, collectively or individually referred to as a "mobile communication device". The system consists of a downloadable application that runs on the subscribers mobile communication devices and communicates with a server-based content composer system. The content composer system manages outgoing content based upon the geographic location reported by the mobile communication device application and the demographic and preference data stored in a subscriber database. The system may optionally store one or more previous geographical locations of the mobile communication device. Using location-based and messaging technologies, relevant sponsored content, mobile emergency alerts, and the ability to facilitate 2-way text or voice based services utilizing Global Positioning System (GPS) mapping is provided to an ad hoc group of subscribers in designated geographic locations. In order to optimize the utility for deaf and hard of hearing subscribers, the mobile communication device may optionally be placed in a low power sleep or hibernate mode instead of a no power mode when the device is turned off. In a hibernate mode, the mobile communication device will wake up to an alert even when the device is hibernating. Moreover, the alerts take over the mobile communication device no matter what other tasks are being executed. In accordance with another important aspect of the invention, in response to emergency content, the system will cause the mobile communication device to vibrate even if the mobile communication device has been configured with the vibrate feature turned off.

DESCRIPTION OF THE DRAWING

These and other advantages of the present invention will be readily understood with reference to the following specification and attached drawing wherein.

DETAILED DESCRIPTION

The present invention relates to a digital content distribution system for delivering location specific content to an ad hoc group of mobile subscribers and a method for delivering, location-specific content directly to a group of mobile communication devices. The system consists of a downloadable application that runs on a subscriber's mobile communication device and communicates with a server-based content composer application. The content composer application manages outgoing content based upon the current geographical location reported by the mobile communication device. The outgoing content may optionally be provided on a subscription basis and may include any demographic and preference data stored in a subscriber database.

The location of each mobile communication device is tracked by the system by way of global positioning system (GPS) signals from the mobile communication devices. During any given time, various subscribers will be located in their home county, for example. The home county as used herein refers to the county of residence of the subscriber as provided during registration of the subscriber. Yet other subscribers may be traveling and located outside of their home county. As such, a geographical unit may include local subscribers in their home county and roaming subscribers from outside of their home county. The subscribers located within the same geographical unit at one time unit, which includes subscribers in their home county and roaming subscribers located outside their home county form an ad hoc group, as used herein. Various content, such as emergency alerts for deaf and hard of hearing subscribers, can then be sent to an ad hoc group of subscribers located in a specific geographical unit, such as a county in the US.

Using available messaging technologies, for example, Short Message Service (SMS) text messaging and/or Multimedia Messaging Service (MMS) multimedia messaging, relevant sponsored content, mobile emergency alerts, and the ability to facilitate 2-way text or voice based services utilizing Global Positioning System (GPS) mapping is provided to an ad hoc group of subscribers. In order to optimize the utility for deaf and hard of hearing subscribers, the mobile communication device may optionally be placed in a low power sleep or hibernate mode instead of a no power mode when the device is turned off. In a hibernate mode, the mobile communication device will wake up to an alert even when it is hibernating. Moreover, the emergency alerts take over the mobile communication device no matter what other tasks are being executed. In accordance with another important aspect of the invention, in response to emergency content, the system will cause the mobile communication device to vibrate even if the mobile communication device has been configured with the vibrate feature turned off.

GENERAL OVERVIEW

Figure 1:
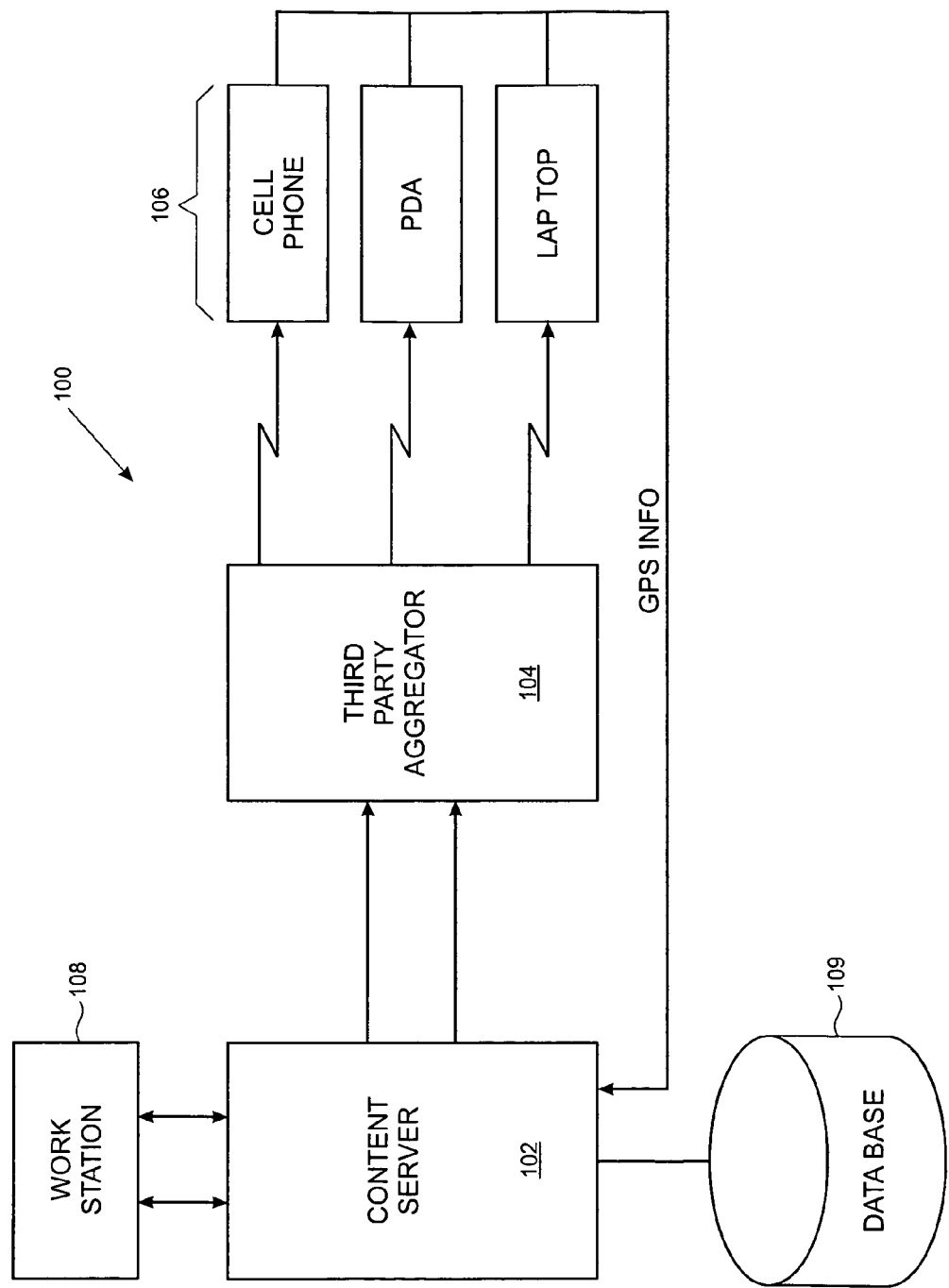
FIG. 1 is a block diagram of a digital content distribution system in accordance with the present invention for delivering location specific content to an ad hoc group of mobile subscribers.

A block diagram of a digital content distribution system in accordance with the present invention for delivering location specific content to an ad hoc group of mobile subscribers is illustrated in FIG. 1 and generally identified with the reference numeral 100. As shown, the system includes a content server 102, an optional third party commercial aggregator 104, one or more mobile subscribers, generally identified with the reference numeral 106 and a work station 108. The work station 108 includes a content composer application which enables digital content to be composed and delivered to an ad hoc group of subscribers. In addition to the content composer application, the server 102, may include a web application which enables two way communication between the server 102 and the work station 108 over the Internet. The web application may also be configured to enable two way communication with mobile subscribers 106 for registration purposes over the Internet.

Subscriber registration information which includes, for example, subscriber demographic and preference information, may be stored in a local or remote database, generally identified by the reference numeral 109. In accordance with the present invention, the subscriber demographic information will include a "home" location and cell phone number. As used herein, the subscriber's home location is the geographic location that the subscriber designates is the preferred location for receiving the digital content, for example, a geographical unit associated with the location of the subscriber's residence. In the exemplary embodiment described and illustrated, the home location is designated as the county of the subscriber's residence. However, any geographical unit can be used.

The content server 102 allows digital content to be distributed and additionally generates a list of subscribers in the ad hoc group to which the digital content is to be delivered. The digital content and the list of subscribers is delivered to the third party commercial aggregator 104, for example, which delivers the digital content to the cell phone numbers of the subscribers on the list by way of the cellular phone network, for example, by way of Short Message Service (SMS) and Multimedia Message Service (MMS) or Short Message Peer-to-Peer (SMPP) protocol.

Alternatively, the digital content could be delivered to third party aggregator 104 via other communication networks, for example, by connection to a commercial gateway over the Internet in Hypertext Transfer Protocol (HTTP). In alternate embodiments of the invention, the third party commercial aggregator 104 can be eliminated and the digital content sent out serially directly by the content server 102.

Ad hoc subscriber lists are formed from subscribers' home locations and roaming subscribers. In accordance with an important aspect of the invention, location specific information, such as emergency information, is only sent to mobile subscribers in a given geographic location even though one or more subscribers are not currently located in their home location. As will be discussed in more detail below, the system keeps track of the current geographic location of each of the mobile subscribers by way of the global positioning system (GPS) available on the mobile communication devices. In particular, GPS data from each of the subscriber's mobile communication devices 106 is sent to the content server 102 directly by way of the cellular phone network on a repeated basis that is optionally configurable at the mobile communication device, for example, every hour defining a sampling period. In particular, each of the mobile communication devices is configured to PING the content server 102. This GPS PING test checks whether each subscriber 106 can reach the content server 102 over the cellular phone network, for example, by sending multiple data packets and listening for a reply from the content server 102. A reply from the content server 102 constitutes a so-called digital handshake. Each subscribing mobile communication device utilizing its data service provided by its cellular service provider send its GPS data over the Internet to the content server 102. The mobile communication devices are configured to convert the GPS data to HTTP protocol. The GPS locations of the responding subscribers are stored, for example, the database 109, by geographic location unit, for example, county. For example, the digital content server 102 may include a commercially available software program called Flash Maps, described at www.flashmaps.com, available from Flash Maps Geospatial located Gettysburg, Pa., for converting the GPS coordinates to geographic units, such as counties. The GPS location of each subscriber is stored in the database 109 and updated periodically to account for subscribers roaming out of the their location. Thus, when digital content that is specific to a specific geographical location unit is to be sent out, the subscribers currently located in that geographic location unit are known.

The work station 108 is used to configure the digital content to be sent to the mobile subscribers, as will be discussed in more detail below. The work station 108 may be configured to provide digital content stored on the content server 102 or database 109 or digital content received by the work station 108, received over the Internet and transmitted to the content server over a communication link, such as the Internet or Intranet. All digital content is sent from the content server 102 to the third party aggregator 104 and ultimately to the subscribers 106.

Figure 2:
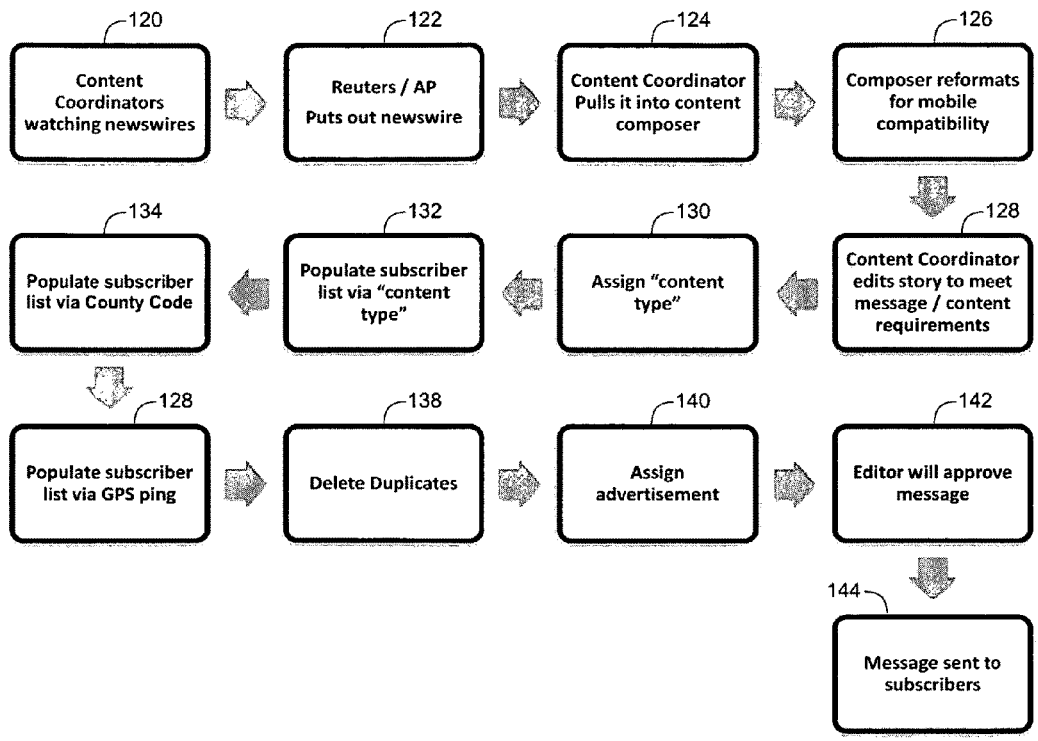
FIG. 2 is a high level software flow chart illustrating the operation of the digital content distribution system illustrated in FIG. 1.

FIG. 2 is a high level software flow chart illustrating the operation of the digital content distribution system illustrated in FIG. 1. In an exemplary embodiment, content coordinators monitor news wires, for example, from Reuters and the Associated Press (AP), as indicated in steps 120 and 122. Such news wires may also include weather bulletins, marine warnings and advisories from the National Weather Service and various emergency radio channels, or other non-emergency digital content. Such digital content may be received by the work station 108 over the Internet. In step 124, the content coordinator imports the digital content into content composer application on the content server 102. The digital content may then be edited and reformatted by the content coordinator, as indicated in steps 126 and 128. In step, 130, the content composer assigns a content type, for example, emergency or non-emergency. Depending on the subscriber preferences and subscription, not all subscribers may prefer or subscribe to both types of content. For example, some subscribers may subscribe to emergency content only. Some subscribers may subscribe to both emergency and non-emergency content. Thus, the system populates a subscriber list based upon the content type and geographic location unit, county or last known GPS location in steps 132 and 134, In step 136, the system updates the database 109 (FIG. 1) with the geographical locations of all of the subscribers in a manner as described above on a repeated basis. Any duplicates are deleted in step 138. Optionally in step 140, advertisements may be added to digital content by way of the content composer. The editor may optionally approve the digital content in step 142 before it is sent to the subscribers in step 144.

Mobile Communication Device Software

Figure 3A:
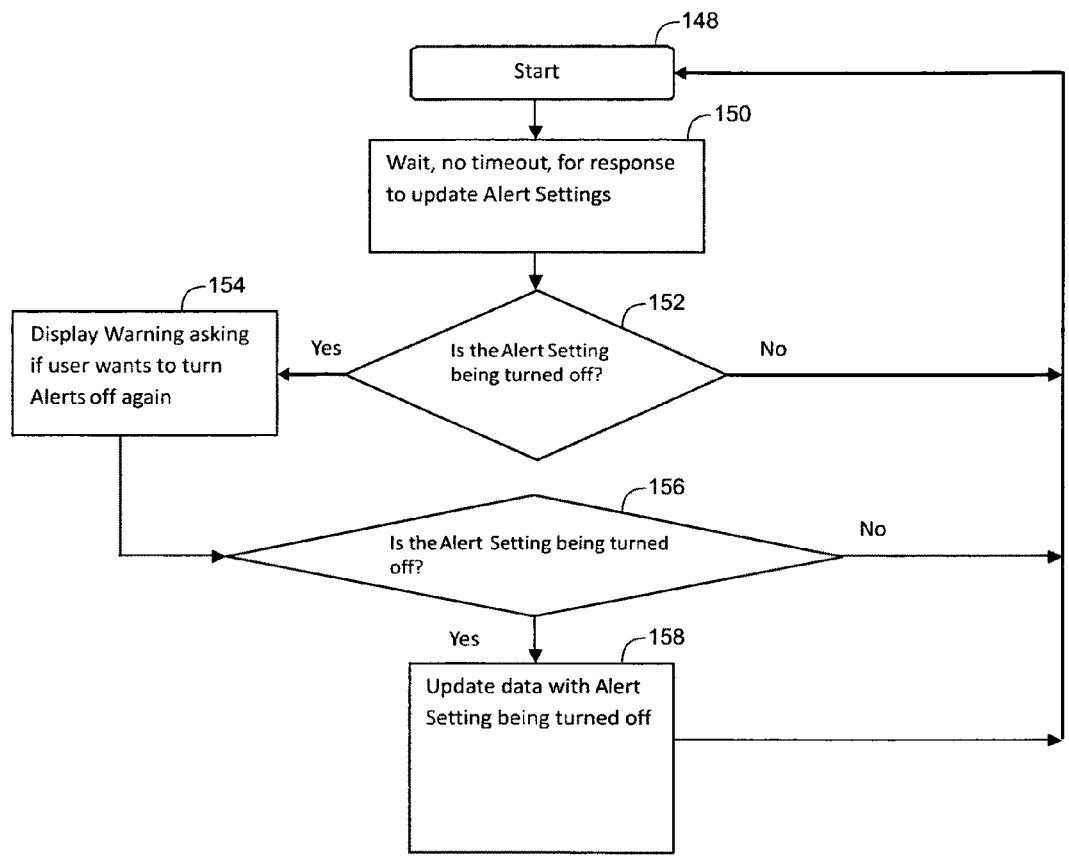
FIGS. 3A-10B are client side software flow charts for use with the mobile communication devices in accordance with the present invention.
Figure 3B:
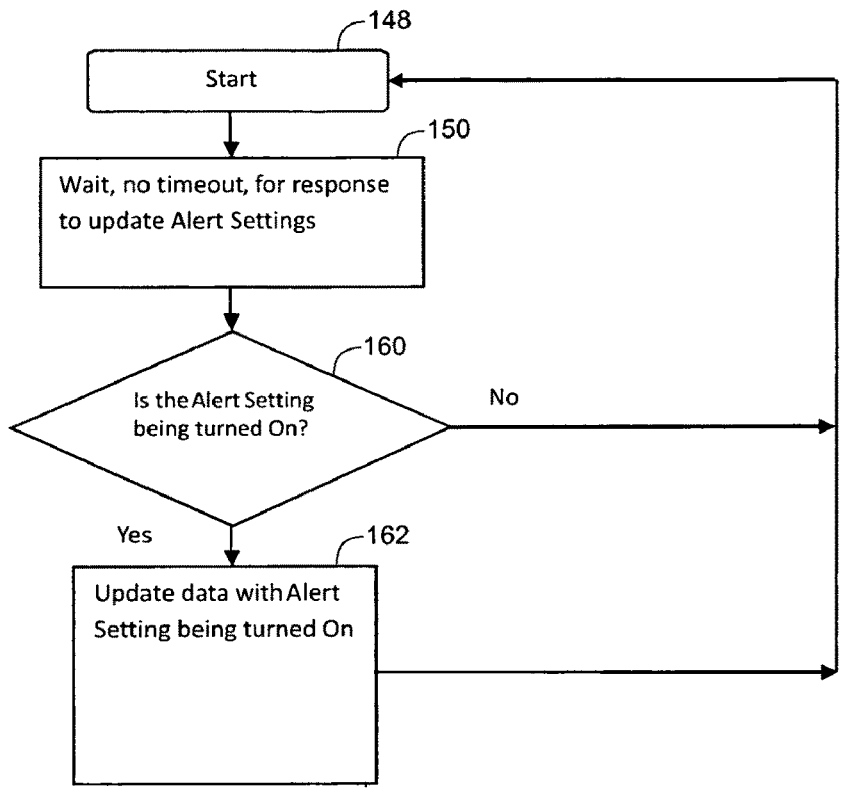
Figure 3C:
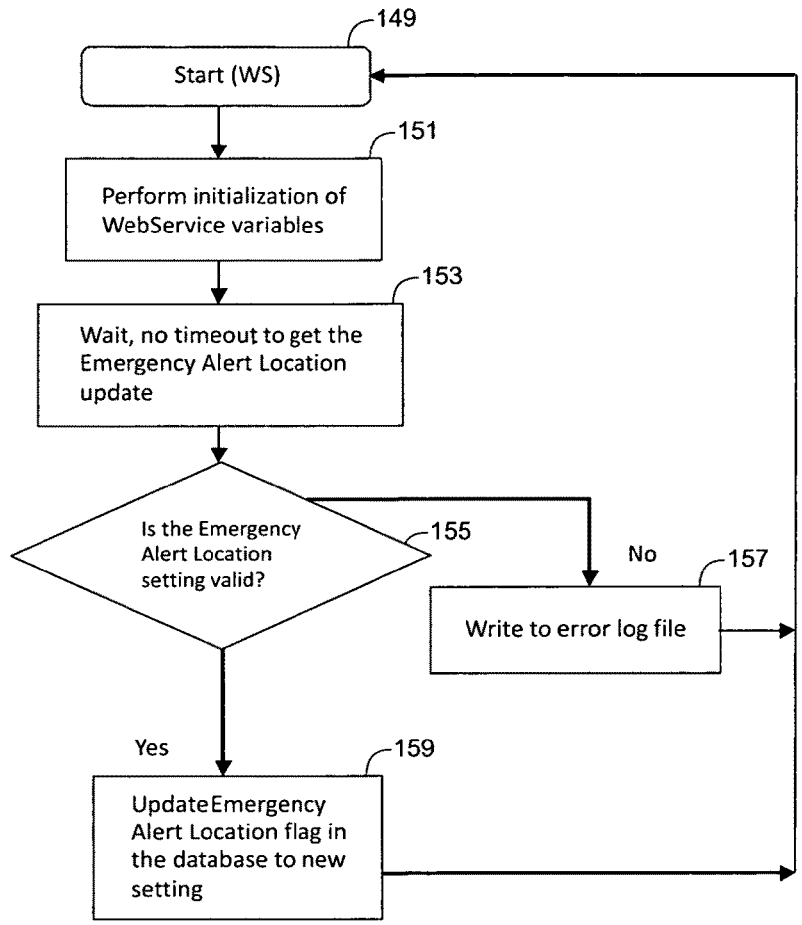
Figure 4:
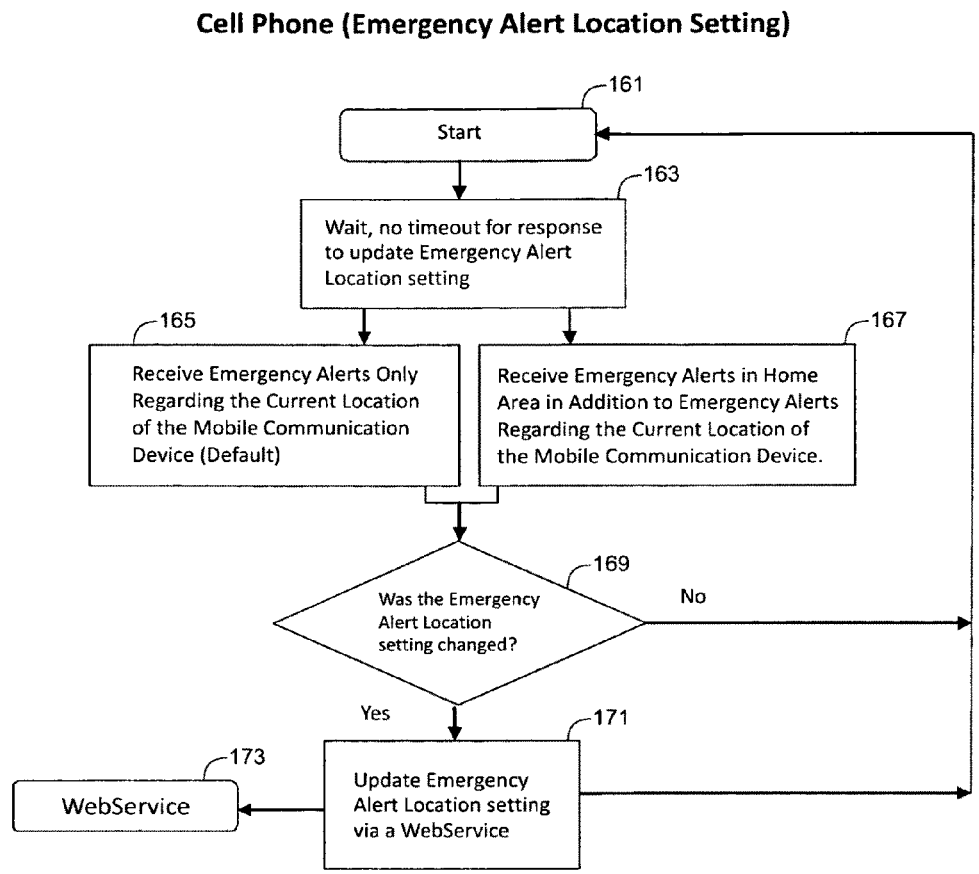

FIGS. 3A-10B illustrate the mobile communication device software. More particularly, FIGS. 3A, 3B, 3C and 4 illustrate an optional configuration settings which allows each subscriber to configure their mobile communication device. Specifically, FIGS. 3A and 3B enable subscribers to configure their mobile communication device to receive Emergency Alerts and interrupt the device as described herein or alternatively disable the interrupt. FIG. 3C disables the mobile communication unit from transmitting its GPS coordinates back to the content server 102 when the Emergency Alert function has been disabled. FIG. 4 illustrates another configuration setting which allows a subscriber to receive Emergency Alerts regarding the subscriber's home even when the subscriber is roaming and not located in their home geographical unit. As used herein, the term interrupt means the ability to receive emergency alerts and interrupt other tasks of the mobile communication device and/or cause the mobile communication device to vibrate even if the vibrate function has been turned off. The term emergency alert is defined to mean emergency information, for example, from the National Weather Service, regarding severe weather in a particular locale or other emergency information, such as, an earthquake, or other disaster not related to the weather.

Turning first to FIG. 3A, this figure illustrates a condition in which the subscriber disables the Emergency Alert function. In particular, on power-up as indicated in steps 148 and 150, the system waits for the user to update the Emergency Alert settings. Once the subscriber updates the Alert settings, the system checks, in step 152 whether the Emergency Alert setting is being turned off. If not, the system loops back to step 148. If the Emergency Alert setting is being turned off, the system optionally displays a warning asking the subscriber if the subscriber really wants to turn off the Emergency Alert function. At this point, the subscriber has the option to confirm or cancel the request to turn off the Emergency Alert function. In step 156, the system checks the subscriber's decision. If the subscriber cancels the request to turn off the Emergency Alert function after the warning is displayed in step 154, the system loops back to step 148 and the setting of the Emergency Alert function will remain at the last setting that was stored in the cell phone memory. If the subscriber confirms the request to turn off the Emergency Alert function, this setting is stored in the cell phone memory in step 158. After the setting is stored in the cell phone memory, the system loops back to step 148.

FIG. 3B illustrates a condition in which the subscriber enables the Alert function. In particular, upon selection of the digital content icon or button, as indicated in step 148, the system waits in step 150 for the user to update the Alert settings, as discussed above. Once the subscriber updates the Alert settings, the system checks in step 160 whether the alert settings are being turned on. If not, the system loops back to step 148. If the Alerts are being turned on, this setting is stored in the cell phone memory in step 162. After the setting is stored in the mobile communication device memory, the system loops back to step 148.

As will be discussed in more detail below, each mobile communication device repeatedly transmits its GPS coordinates back to the content server by way of a wireless Internet communication link hosted by the cellular phone carrier. As such, the mobile communication device repeatedly transmits its GPS coordinates back to the content server when the GPS function has been enabled. Referring to FIG. 3C, the web service on the mobile communication device is initialized on power up, as indicated in steps 149 and 151. In step 153, recent GPS coordinates are obtained from the GPS system on board the mobile communication device and sent to the content server 102. As discussed in more detail below, these GPS coordinates are checked at the content server to determine if the GPS coordinates are valid in step 155. These GPS coordinates along with previous GPS coordinates are stored in the database 109. If the new GPS coordinates are valid, an Emergency Alert Location flag in the database is set to indicate the most current GPS coordinates for that mobile communication device in step 159. Alternatively, if it is determined in step 155 that the GPS coordinates are not valid, the system writes to the error log in step 157 and loops back to step 149.

FIG. 4 illustrates an optional configuration setting that enables a subscriber to configure their mobile communication device to receive Emergency Alerts regarding both the location of their mobile communication device and their home geographical unit or alternatively only Emergency Alerts regarding the current location of their mobile communication device. In response to selection of this configuration setting by the subscriber, as indicated in steps 161 and 163, the subscriber can select to receive emergency alerts which only relate to the current geographical unit in which the mobile communication device is located as indicated in step 165. With this configuration, subscribers with mobile communication devices will receive Emergency Alerts regarding their home geographical unit only when the subscriber's mobile communication device is located within their home geographical unit. In the situation where the subscriber's mobile communication device roams outside of the subscriber's home geographical unit, the subscriber's mobile communication device will only receive Emergency Alerts regarding the most recent geographical unit in which the mobile communication device is located. With this configuration, the telephone number of the roaming subscriber is deleted from the list of home subscribers before the Emergency Alert is sent out, as indicated in step 165 and will be discussed in more detail below. Alternatively, the subscriber can configure their mobile communication device to receive Emergency Alerts regarding the most recent geographical unit in which the mobile communication device is located and Emergency Alerts regarding the subscriber's home geographical unit even when the subscriber's mobile communication device is located outside of the subscriber's home geographical unit as indicated in step 167. In step 169, the system checks whether the last configuration setting was changed. If not, the system loops back to step 161. If the setting has changed, the configuration is transmitted back to the content server 102 via a wireless Internet communication link hosted by the cellular phone carrier, as indicated in steps 171 and 173.

Figure 5:
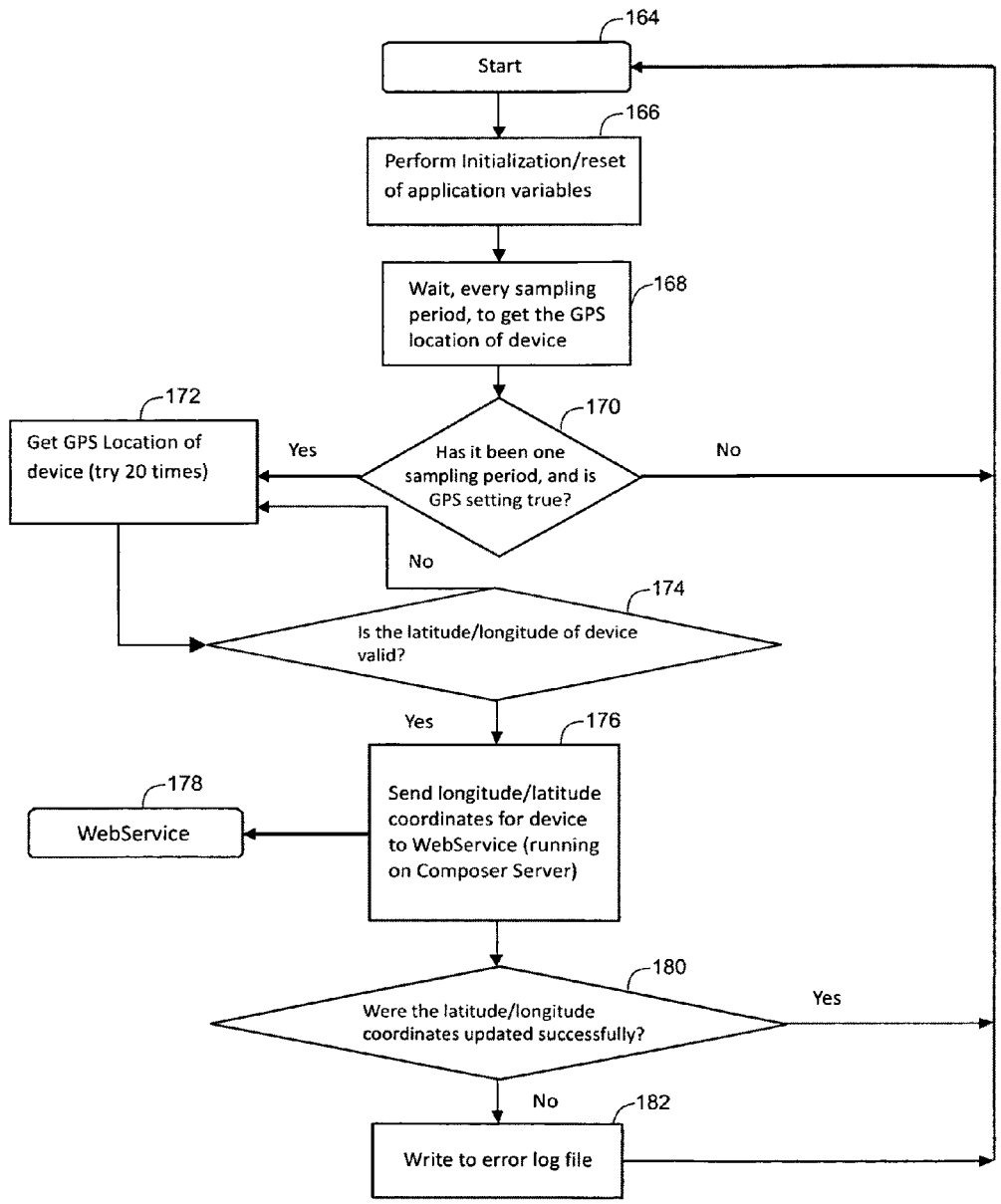

FIG. 5 illustrates the interaction between the digital content distribution system 100 and a conventional GPS system, as available on GPS equipped cell phones. Initially on power up, as indicated in step 164, the system initializes and resets GPS variables, such as the GPS configuration variables, illustrated in FIGS. 6 and 7, as indicated in step 166. As is known in the art, GPS equipped devices rely on signals from a GPS satellite system which allow the device to determine its position in terms of the longitude and latitude of the device based upon triangulation of the signals from at least three (3) satellites. In steps 168 and 170, the system will sample the GPS location of the cell phone or other mobile communication device from the GPS system on board the mobile communication device on a repeated basis defining a sampling period, for example, every hour. In between sampling periods, the system waits and loops back to step 164. After each time the GPS signal is sampled, the system checks with the GPS system on board the mobile communication device to determine if the sample was valid. Known GPS systems are able to verify the validity of GPS locations. As indicated in step 172 and 174, the system will attempt multiple times to obtain a valid GPS location from the GPS system for example, 20 times. Normally, a valid GPS location signal will be available within, for example, 20 sampling periods unless the mobile communication device is located in an area where it cannot receive the GPS signals from the GPS satellites, for example, certain buildings, aboard aircraft and other locations. In such a situation, the system will simply loop between steps 172 and 174 until some number of GPS location signals have been received, for example 20.

Figure 6:
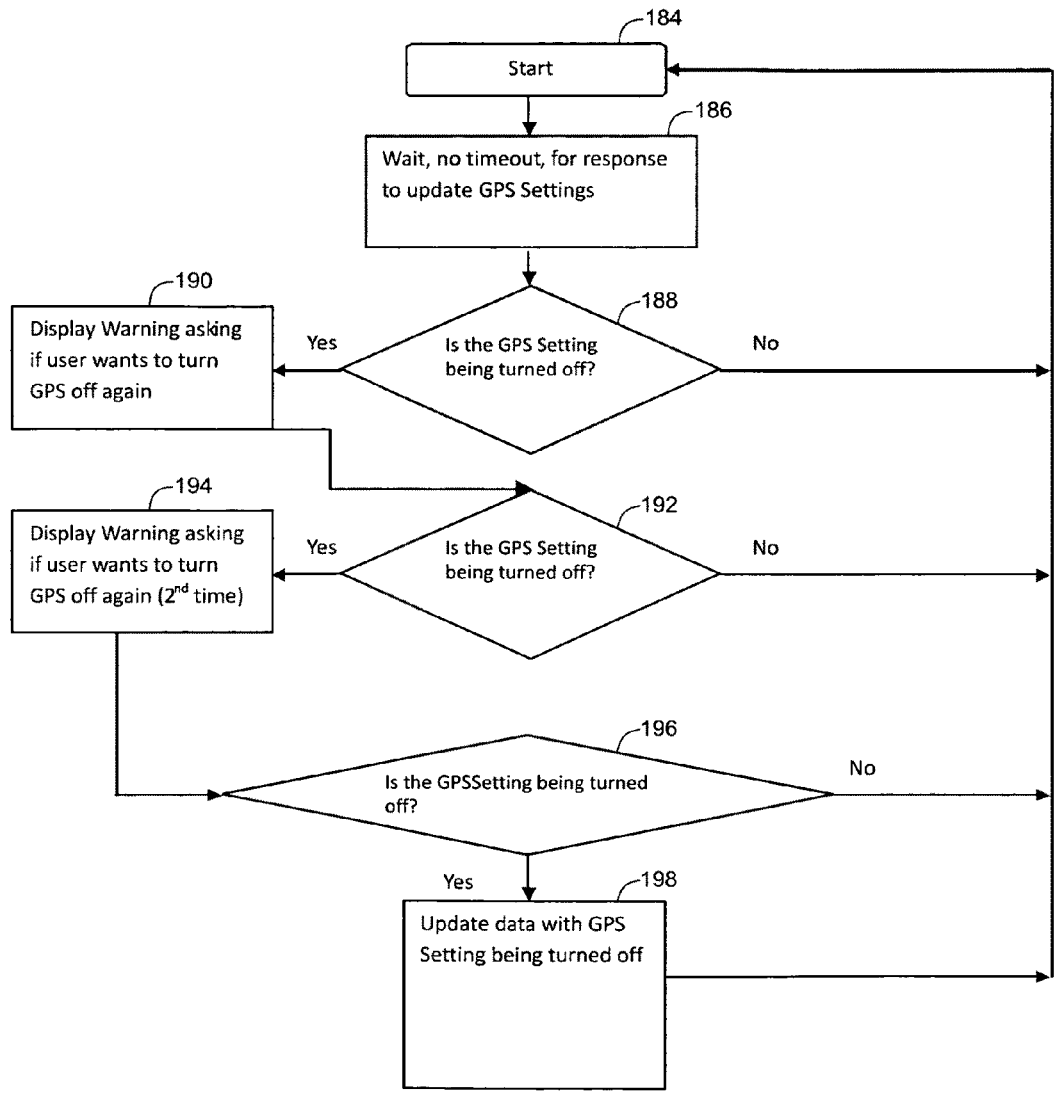
Figure 7:
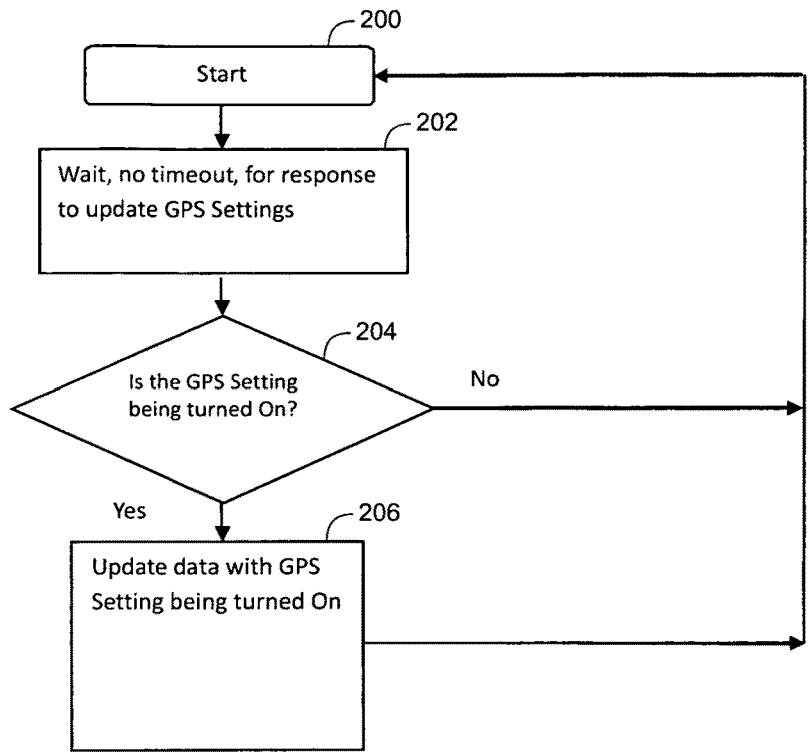

Once a valid location signal has been received during a sampling period, the GPS location signal for that sampling period for that mobile communication device is sent to the content server 102 (FIG. 1) in step 176. In one embodiment of the system, the GPS location of the mobile communication device 106 may be sent to the content composer 102 by way of the Internet as indicated in step 178, for mobile communication devices that subscribe to mobile data service from their cellular phone carrier. In such an embodiment, the GPS location signal is converted to HTTP protocol and sent to the content composer 102. Alternatively, for mobile communication devices do not subscribe to mobile data service from their cellular phone carrier, the GPS location of the mobile communication device 106 can be sent by SMS to the content server 102. Either way, the system checks in step 180 whether the GPS location was successfully sent to the content server 102. If not, a message is written to the error log in step 182. If the system determines the GPS location signal was successfully sent to the content server 102, the system then loops back to step 164 and waits for the next GPS location signal. FIGS. 6 and 7 relate to configuration settings for the GPS system, available with known mobile communication devices equipped with GPS capability which enables or disables the ability of the mobile communication device to send its GPS data to the content server 102. FIG. 6 illustrates the condition in which the subscriber disables GPS communications to the content server while FIG. 7 illustrates a configuration in which GPS communication to the content server is enabled. Turning first to FIG. 6, the block 184 represents the step in which the subscriber selects the digital content icon on the mobile communication device 106 GUI, as discussed above. After the subscriber selects the digital content icon, the subscriber is prompted in step 186 to configure the ability of the mobile communication device to transmit GPS data to the content server. The system waits for action by the subscriber. Once the subscriber takes action, the system checks in step 188 whether the subscriber has disabled the communication GPS data from being sent to the content server 102. If not, the system loops back up to step 184. If the subscriber disabled communications of the GPS data to the content server, the system will generate a visual warning in step 190 prompting the subscriber to confirm that GPS communications to the content server 102 are to be turned off. If the subscriber confirms that GPS communications to the content server 102 are to be turned off, as indicated in step 192, the system will cause the display to display a warning a second time in step 194 prompting the subscriber to confirm again that communication of GPS data to the content server 102 is to be turned off. If the subscriber confirms a second time, as indicated in step 196, the system stores the setting in memory on board the mobile communication device in step 198. The system then loops back to step 184. If the subscriber changes their mind after the prompts associated with the warnings displayed in steps 190 and 194, the system simply loops back to step 184.

FIG. 7 illustrates a condition in which the subscriber configures the mobile communication device so as to enable communication of GPS data to the content server 102. In particular, upon selection of the digital content icon or button, as indicated above and represented by the block 200, the system waits in step 202 for the subscriber to update the GPS configuration. Once the subscriber updates the GPS configuration, the system checks in step 204 whether communications of the GPS data to the content server 102 is being enabled. If not, the system loops back to step 200. If communications of the GPS data to the content server 102 is being enabled or turned on, this setting is stored in the mobile communication device memory in step 206. After the setting is stored in the mobile communication device memory, the system loops back to step 200.

Figure 8:
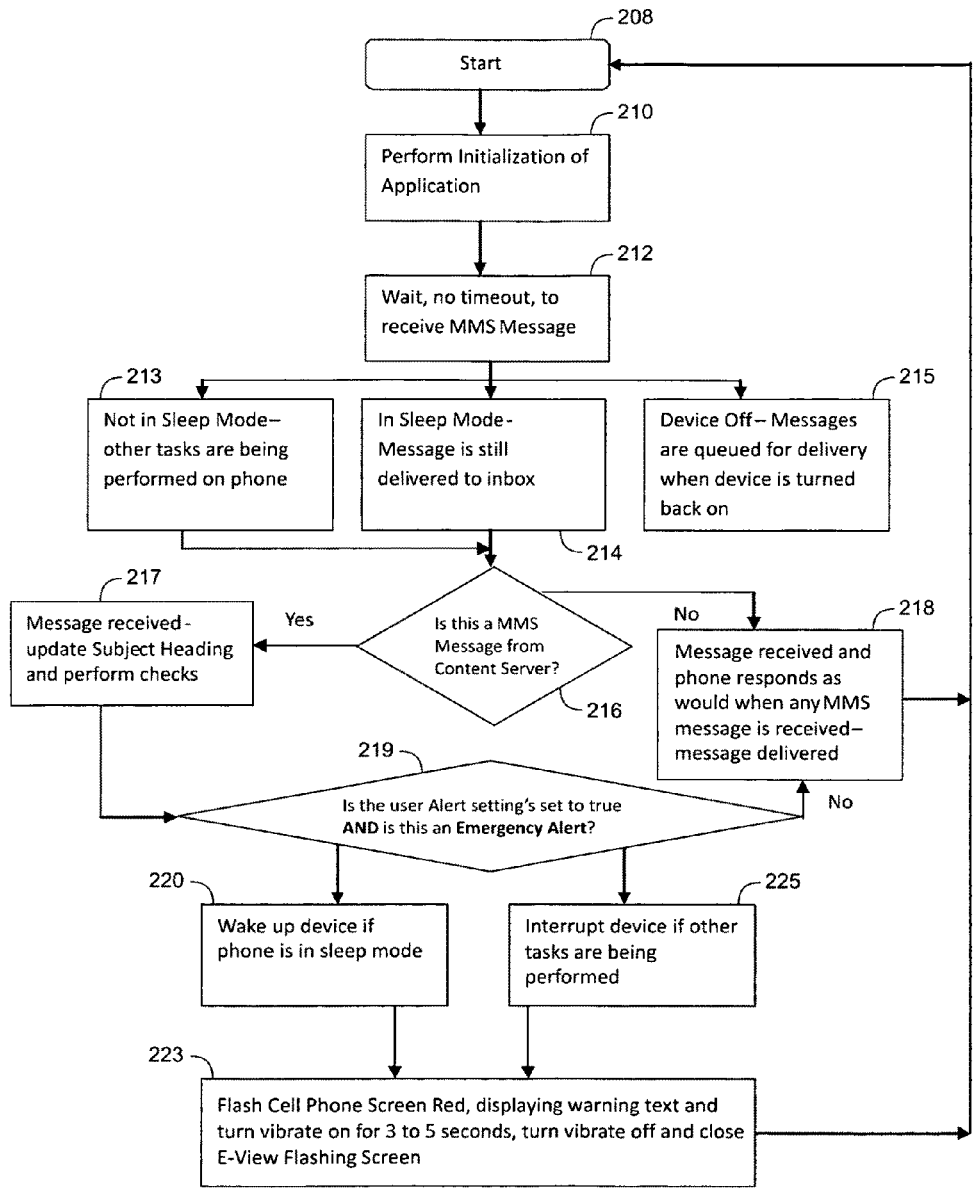
Figure 9:
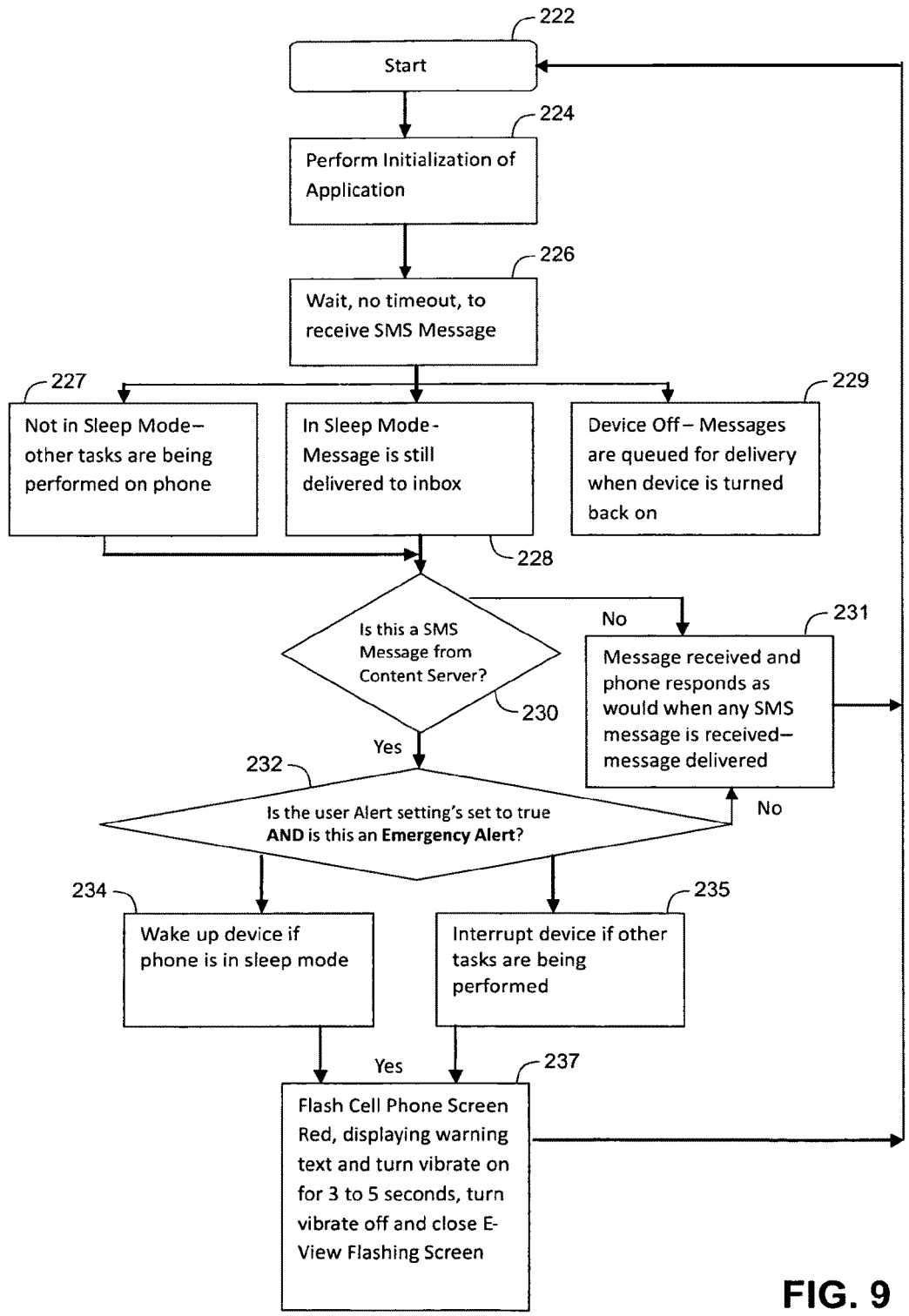

FIGS. 8 and 9 illustrate receipt of MMS and SMS messages, respectively, by the mobile communication device. Referring first to FIG. 8, this application is running anytime the mobile communication device is powered up. On power up, as indicated by the block 208, the system initializes the application which includes checking the system configuration settings and configuring the system in accordance with those settings, as indicated in step 210. The system configuration settings include: the GPS communication to the digital content server, as discussed above, as well as the sleep mode setting and the emergency alert setting, discussed below. In step 212, the system waits for an MMS message. If the MMS message is not from the content server 102, as determined in step 216, the system loops back to step 208 and waits for another MMS message by repeating steps 210 and 212. When a message is received, the disposition of the message depends on several factors including the on-off status of the mobile communication device; whether the message is an emergency message and the configuration setting of the emergency alert functionality. As illustrated in boxes 213 and 214, the message is delivered to the in box of the mobile communication device, as long as the mobile communication device is not off, as indicated in step 215. If the mobile communication device is off, the message sits in the cell phone carrier's message queue. The cell phone carrier periodically queries the mobile communication device in order to deliver the message when the mobile communication device is turned on.

When the message is received by the mobile communication device, as indicated in steps 217 and 218, the message is placed in the in box of the mobile communication device. In order to locate the new message in the in box, the system locates the new message by parsing subject heading data. Commercially available software, for example, In The Hand Mobile software, available from In The Hand Ltd., described at http://32feet.net/, to locate the new message in the in box. Once the new message is located, the system checks in step 216 whether the message was from the content server 102. If not, the message is handled by the mobile communication device in a conventional manner, as indicated by the block 218. If the message was from the content server 102, the system checks in step 219, whether the mobile communication device has been configured to receive emergency alerts and whether the message is in fact an emergency alert. If either the mobile communication device has been configured to disable emergency alerts and/or the message is not an emergency alert, the system proceeds to step 218 and handles the message in a conventional manner.

On the other hand, if the MMS message was from the content server 102 and the mobile communication device has been configured so that the emergency alert feature is enabled, the system wakes up the mobile communication device if it was in the sleep or hibernate mode in step 220. Next in step 223, the system initiates the Alert function, for example, by flashing the display on the mobile communication device red and causing the mobile communication device to vibrate, for example 3-5 seconds and display the emergency content. Subsequently, the system turns off the vibrate mode and causes the mobile communication device to return to a conventional operating mode of the mobile communication device.

FIG. 9 illustrates the receipt of an SMS message. This application is running anytime the mobile communication device is powered up. On power up, as indicated by the block 222, the system initializes the application which includes checking the system configuration settings and configuring the system in accordance with those settings, as indicated in step 224. The system configuration settings include: the GPS communication to the digital content server, as discussed above, as well as the sleep mode setting and the emergency alert setting, discussed below. In step 226, the system waits for an SMS message. If the SMS message is not from the content server 102, as determined in step 230, the system loops back to step 222 and waits for another SMS message by repeating steps 224 and 226. When a message is received, the disposition of the message depends on several factors including the on-off status of the mobile communication device; whether the message is an emergency message and the configuration setting of the emergency alert functionality. As illustrated in boxes 227 and 228, the message is delivered to the in box of the mobile communication device, as long as the mobile communication device is not off, as indicated in step 229. If the mobile communication device is off, the message sits in the cell phone carrier's message queue. The cell phone carrier periodically queries the mobile communication device in order to deliver the message when the mobile communication device is turned on.

When the message is received by the mobile communication device, the message is placed in the in box of the mobile communication device. In order to locate the new message in the in box, the system locates the new message by parsing subject heading data. Commercially available software, for example, In The Hand Mobile software, as mentioned above, to locate the new message in the in box. Once the new message is located, the system checks in step 230 whether the message was from the content server 102. If not, the message is handled by the mobile communication device in a conventional manner, as indicated by the block 231. Next, the system checks in step 232, whether the mobile communication device has been configured to receive emergency alerts and whether the message is in fact an emergency alert. If either the mobile communication device has been configured to disable emergency alerts and/or the message is not an emergency alert, the system proceeds to step 231 and handles the message in a conventional manner.

On the other hand, if the SMS message was from the content server 102 and the mobile communication device has been configured so that the emergency alert feature is enabled, the system wakes up the mobile communication device if it was in the sleep or hibernate mode in step 234 and interrupts any other tasks being performed by the mobile communication device, such as voice communications, as indicated in step 235. Next in step 237, the system initiates the Alert function, for example, by flashing the display on the mobile communication device red and causing the mobile communication device to vibrate, for example 3-5 seconds and subsequently turning off the vibrate mode and causing the mobile communication device to enter a sleep mode, as discussed in more detail below.

Figure 10A:
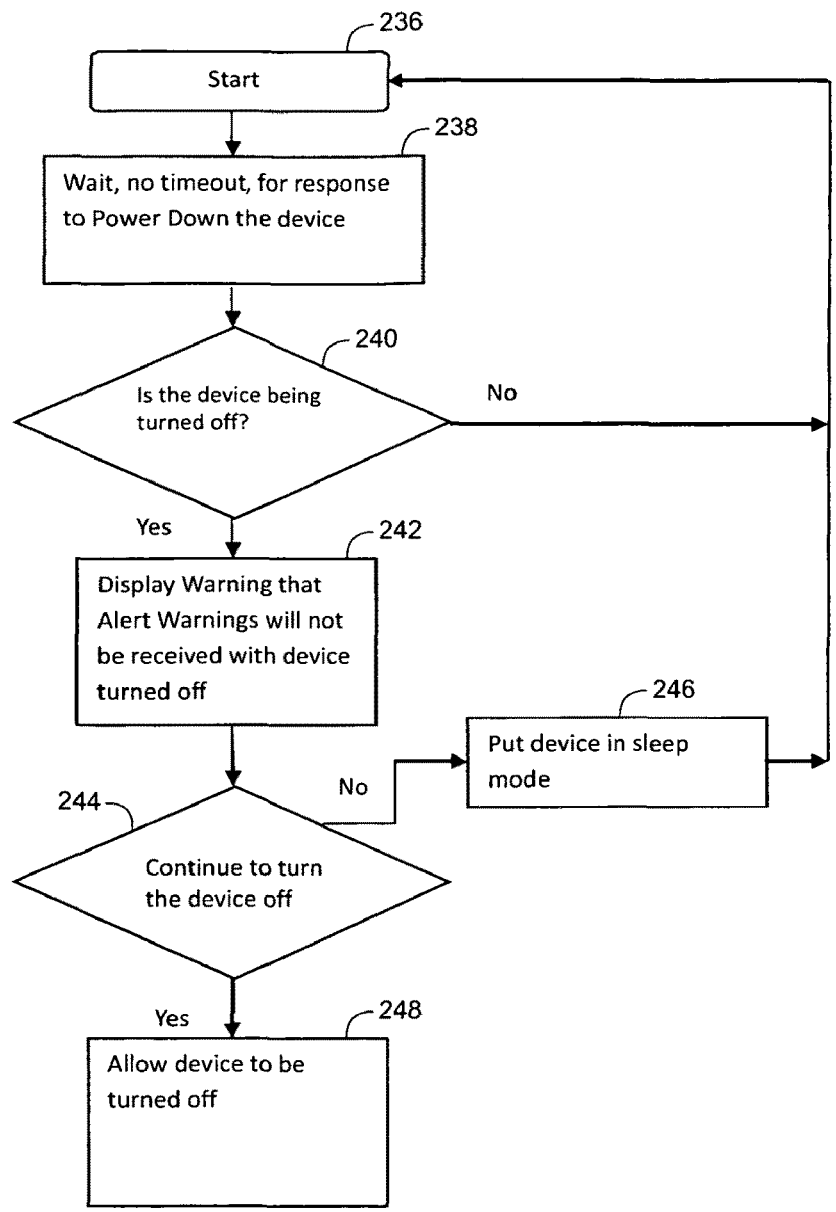

FIG. 10A illustrates power down interrupt function of the mobile communication device. The application in accordance with the present invention is configured to be utilized with existing mobile communication devices. Normally, when a mobile communication device is turned completely off, the device cannot receive any alerts or messages. When the power down interrupt function in accordance with one aspect of the present invention is enabled, it allows the device to be placed in a minimal power or sleep or hibernate mode in which the device can listen for messages and wake up when a message is received.

The power down interrupt function can be implemented on mobile communication devices which have operating systems which allow modification of their power down function, such as Windows CE (also known as Windows Embedded Compact). Some known operating systems for mobile communication devices, such as the RIM operating system does not currently allow the power off state of the mobile communication device to be disabled. In those mobile communication devices, messages cannot be received in the power off state. Thus, when a device with such an operating system is turned off, the device cannot receive any messages. The message sits in a message queue at the cell phone carrier until the device is turned on, as discussed above.

For mobile communication devices which allow the power off state to be disabled, in accordance with the present invention, those mobile communication devices can be configured so as to place the mobile communication device in a sleep mode which allows emergency alerts from the content composer 102 to be received even when the phone is in a sleep or hibernate mode.

FIG. 10A is a software flow chart for a mobile communication device which allows its power off state to be disabled. In steps 236 and 238, the system waits for the mobile communication device to be turned off and continually loops back to step 236 and repeats steps 238 and 240. If the system detects the mobile communication device is being turned off in step 240, the system causes the display on the mobile communication device to display a warning that the Emergency Alerts will not be received with the mobile communication device turned off. The subscriber is then prompted to confirm that the mobile communication device is to be turned off or alternatively place the mobile communication device in a sleep mode. If the subscriber selects a sleep mode, the mobile communication device is placed in a sleep mode in step 246 and the system loops back to step 236. On the other hand, if the subscriber confirms that the mobile communication device is to be turned off, the device is turned off in steps 244 and 248.

Figure 10B:
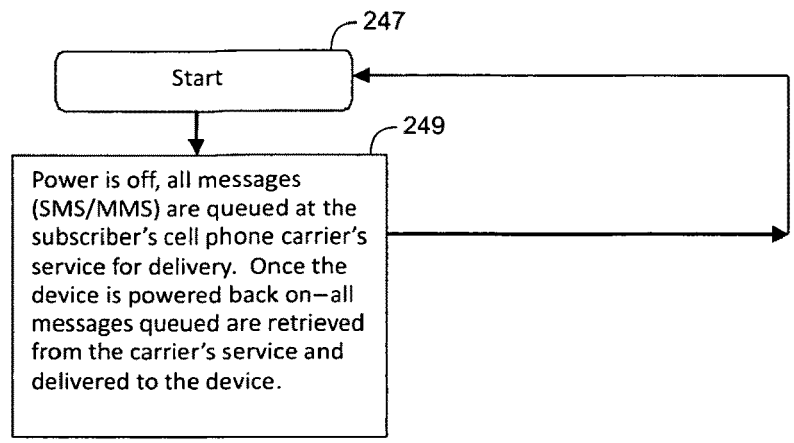

FIG. 10B illustrates a condition in which the mobile communication device 10B is turned off and the mobile communication device cannot be configured to enter a sleep or hibernate mode. In this mode, once power is turned off, as indicated in block 247, the system powers down. In this mode, all messages sent to the mobile communication device during a power down condition are stored in a message queue maintained by the cellular carrier, as indicated by the block 249. The cellular carrier continually queries the intended mobile communication device recipient and delivers the message when the mobile communication device is turned on.

Content Composer Software

Figure 11:
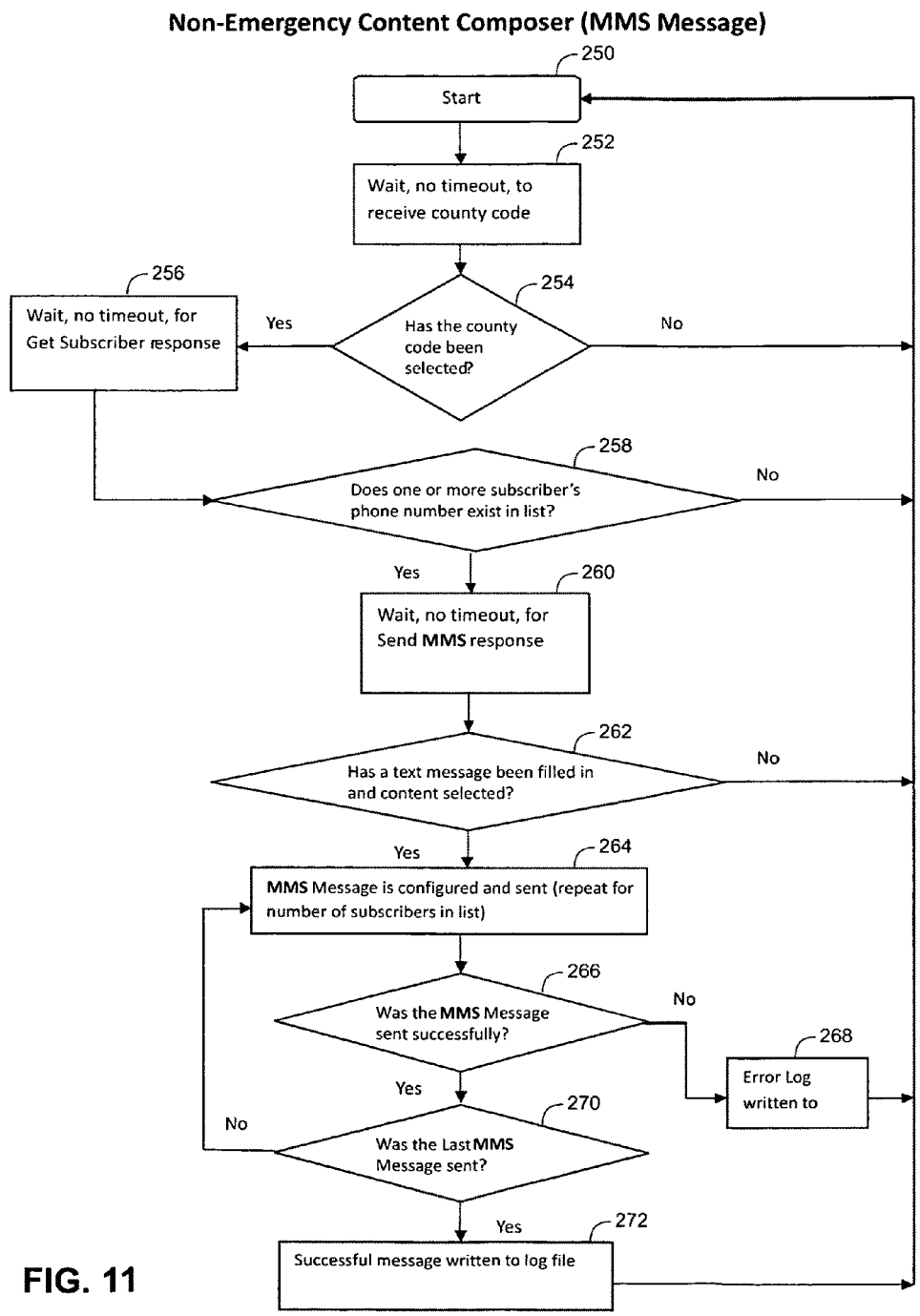
FIGS. 11-15 are server side software flow charts for the digital content distribution system illustrated in FIG. 1.
Figure 12:
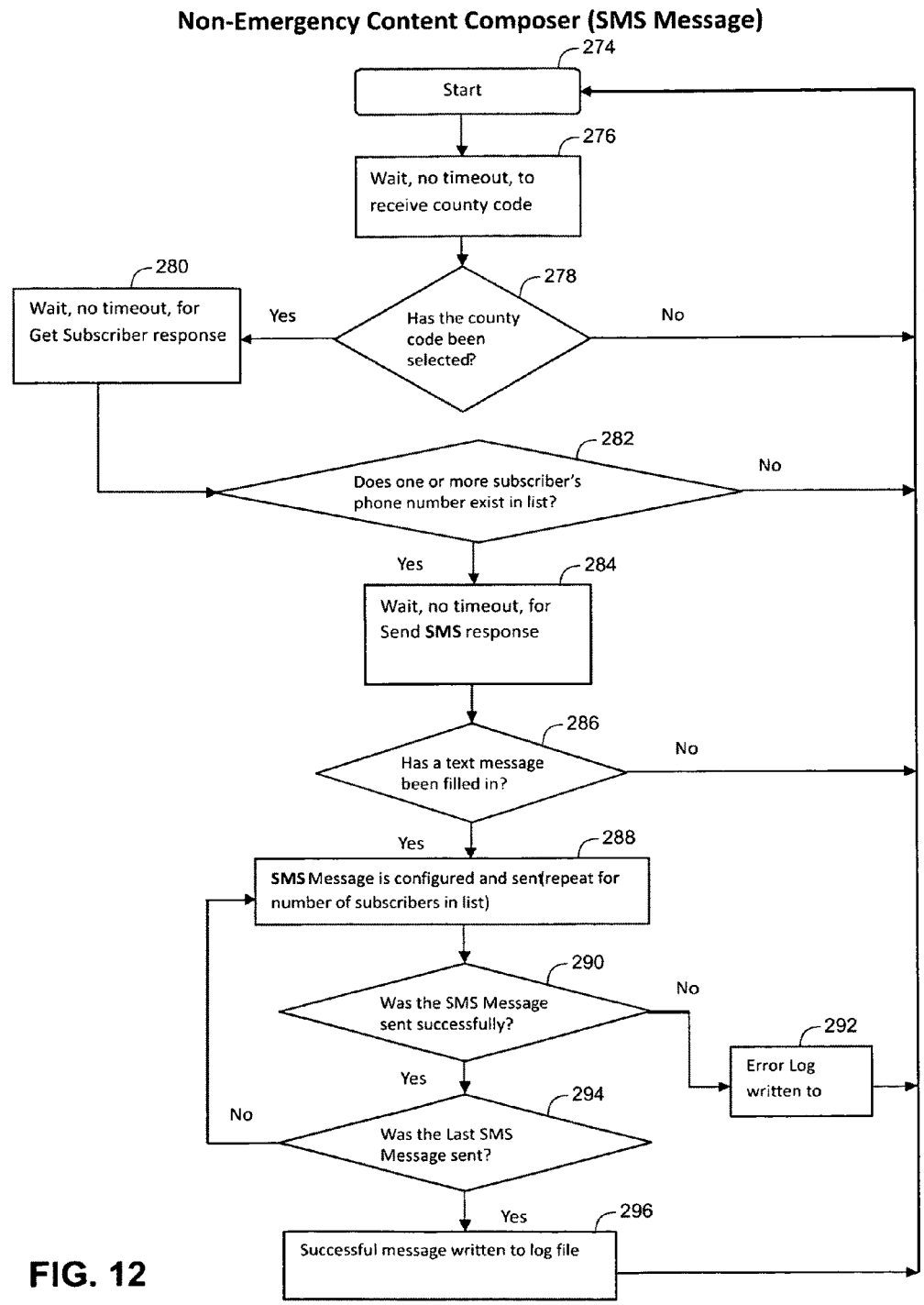
Figure 13:
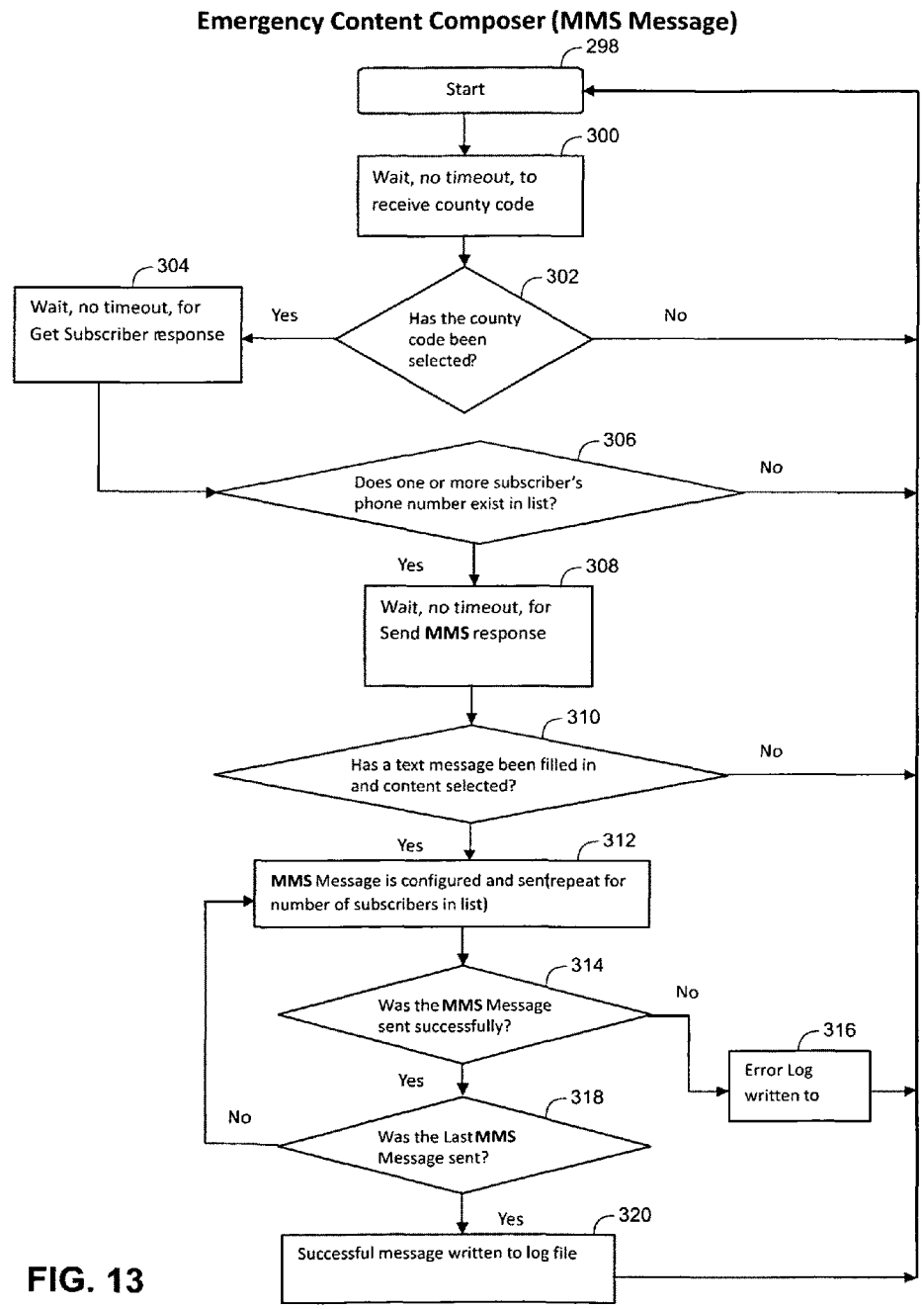
Figure 14:
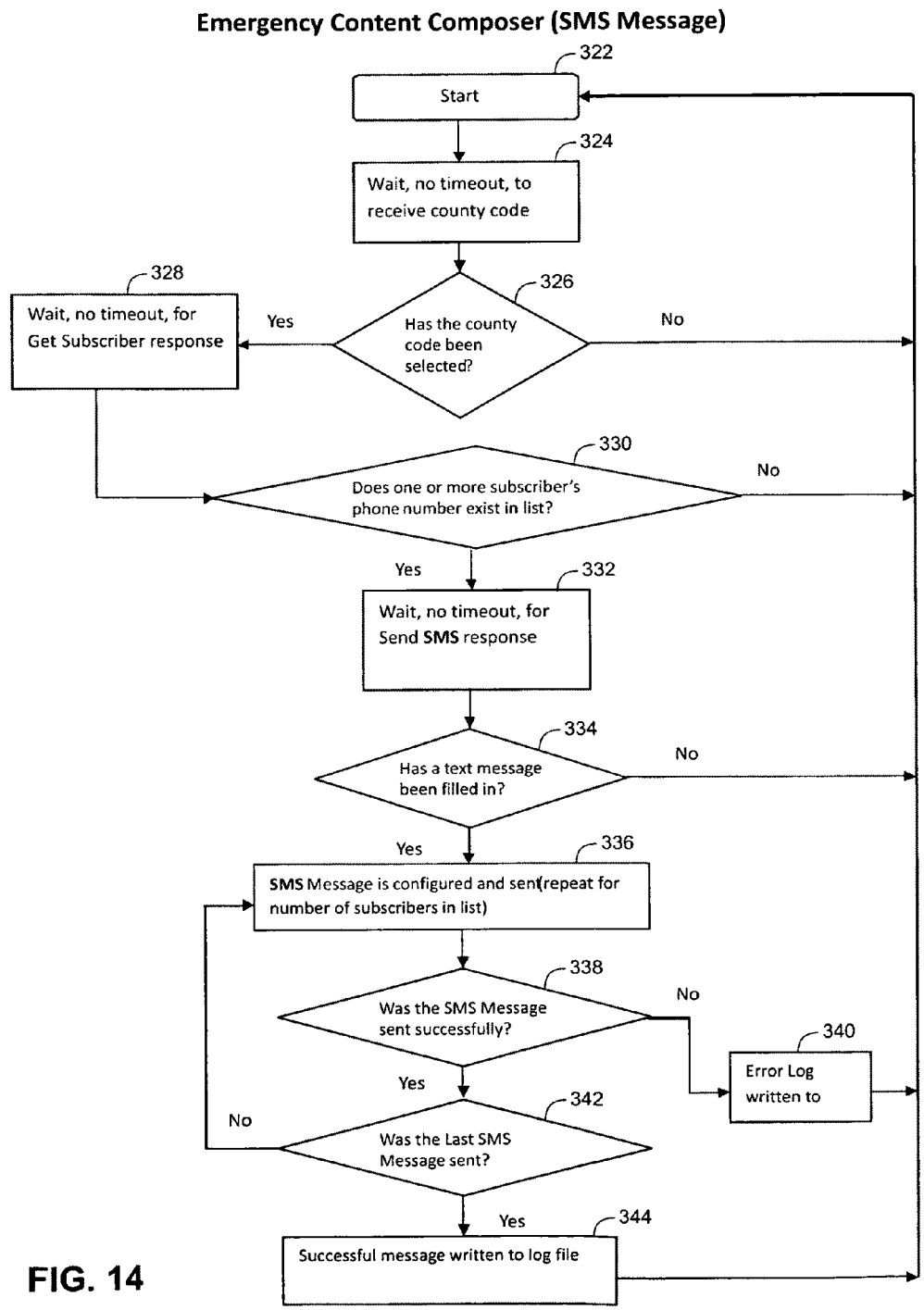
Figure 15:
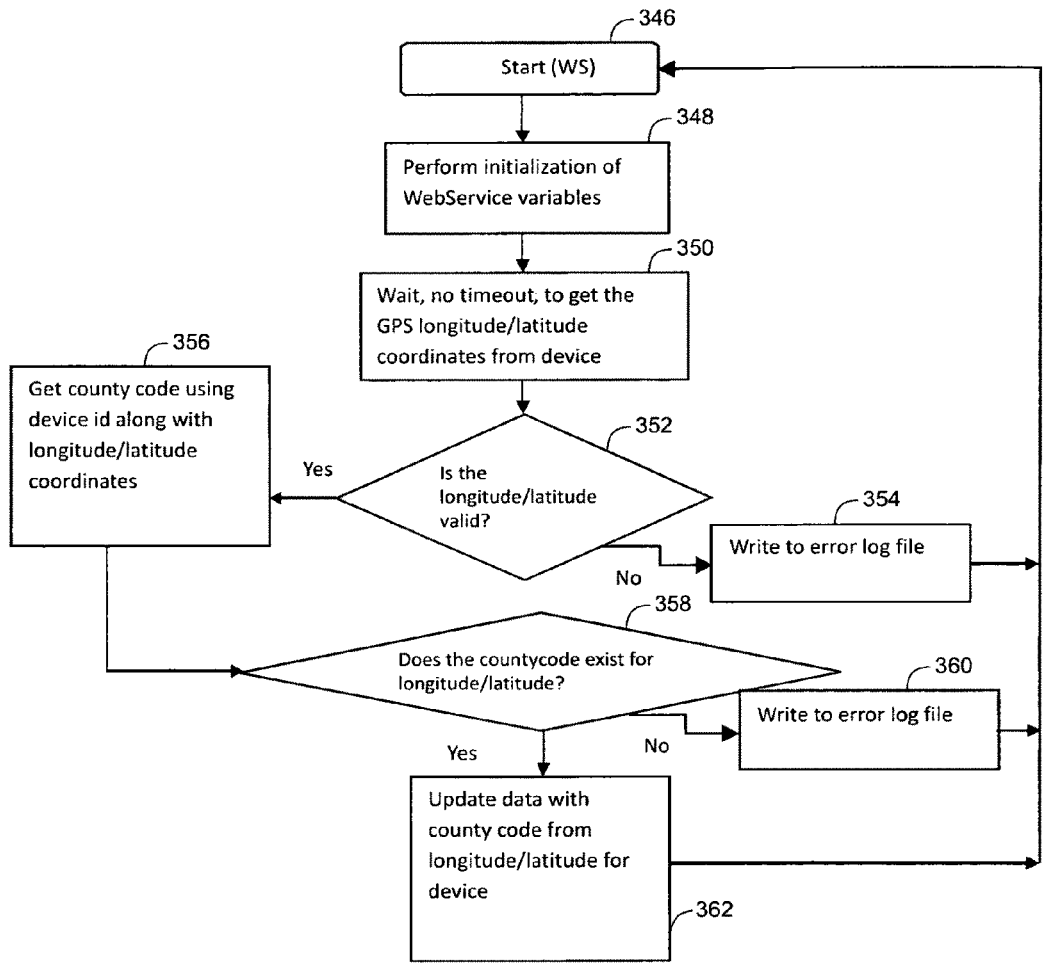

FIGS. 11-15 illustrate the software for the content composer 102. FIGS. 11 and 12 relate to non-emergency content while FIGS. 13 and 14 relate to emergency content. FIG. 15 illustrates optional web service software for receiving GPS location data via the Internet, as discussed above.

Referring to FIGS. 11 and 12, FIG. 11 relates to non-emergency MMS messages while FIG. 12 relates to non-emergency SMS messages. Turning first to FIG. 11, the system waits in steps 250 and 252 for the content coordinator to enter a code for a geographical unit, such as a county, to which the digital content is to be sent. Once a geographical unit is selected by the content coordinator, as indicated in step 254 and the "Get Subscribers" button 385 (FIG. 17) is selected, the system queries its database 109 for the last known GPS location of subscribers 106 which includes the subscribers that are located by GPS (that have not disabled communications of their GPS data back to the content server) within the selected geographical unit, along with the subscribers that are registered to the selected geographical unit. This geographical unit would include both home subscribers and roaming subscribers In step 256 the subscribers form an ad hoc group and are maintained in a list, as will be discussed in more detail below. As long as one subscriber is listed in the list, as determined in step 258, the MMS message waits in step 260 to send out the MMS message until the MMS message is configured. Once the MMS message is configured, as indicated in step 262, the MMS message is sent to each subscriber on the list mentioned above, as indicated in step 264. The system checks in step 266 whether each message was sent successfully. If not, the system writes an error message to an error log, as indicated in step 268. The system continually checks in step 270 whether the MMS message was sent to all subscribers on the list. When the MMS message is sent to the last subscriber on the list. It then writes a message to the message log file indicating that the MMS message was successfully sent to all subscribers on the list in step 272.

FIG. 12 relates to SMS messages of non-emergency content. Initially in steps 274 and 276, the system waits for the content coordinator to enter a code for a geographical unit, such as a county, to which the digital content is to be sent. Once a geographical unit is selected by the content coordinator, as indicated in step 278 and the "Get Subscribers" button 385 (FIG. 17) is selected, The system queries its data base 109 for the last known GPS location of subscribers 106; which includes the subscribers that are located by GPS (that have not disabled communications of their GPS data back to the content server 102) within the selected geographical unit, along with the subscribers that are registered to the selected geographical unit which forms an ad hoc group of subscribers. As such, the ad hoc group would include both home subscribers and roaming subscribers. In step 280 the subscribers forming the ad hoc group are maintained in a list. As long as one subscriber is listed in the list, as determined in step 282, the SMS message is waits in step 284 to send out the SMS message until the SMS message is configured. Once the MMS message is configured, as indicated in step 286, the SMS message is sent to each subscriber on the list mentioned above, as indicated in step 288. The system checks in step 290 whether each message was sent successfully. If not, the system writes an error message to an error log, as indicated in step 292. The system continually checks in step 294 whether the SMS message was sent to all subscribers on the list. When the SMS message is sent to the last subscriber on the list. It then writes a message to the message log file indicating that the SMS message was successfully sent to all subscribers on the list in step 296.

FIGS. 13 and 14 relate to the receipt of emergency content by way of MMS and SMS messages, respectively. Referring first to FIG. 13, the system waits in steps 298 and 300 for the content coordinator to enter a code for a geographical unit, such as a county, to which the digital content is to be sent. Once a geographical unit is selected by the content coordinator, as indicated in step 302, and the "Get Subscribers" button 385 (FIG. 17) is selected, the system queries its database 109 for the last known GPS location of subscribers 106 which includes the subscribers that are located by GPS (that have not disabled communications of their GPS data back to the content server) within the selected geographical unit, along with the subscribers that are registered to the selected geographical unit. This geographical unit would include both home subscribers and roaming subscribers In step 304 the subscribers forming the ad hoc group are maintained in a list, as will be discussed in more detail below. As long as one subscriber is listed in the list, as determined in step 306, the MMS message is waits in step 308 to send out the MMS message until the MMS is configured. Once the MMS message is configured, as indicated in step 310, the MMS message is sent to each subscriber on the list mentioned above, as indicated in step 312. The system checks in step 314 whether each message was sent successfully. If not, the system writes an error message to an error log, as indicated in step 316. The system continually checks in step 318 whether the MMS message was sent to all subscribers on the list. When the MMS message is sent to the last subscriber on the list, the system writes a message to the message log file indicating that the MMS message was successfully sent to all subscribers on the list in step 320.

FIG. 14 relates to SMS messages of emergency content. Initially in steps 322 and 324, the system waits for the content coordinator to enter a code for a geographical unit, such as a county, to which the digital content is to be sent. Once a geographical unit is selected by the content coordinator, as indicated in step 326, and the "Get Subscribers" button 385 (FIG. 17) is selected, the system queries its database 109 for the last known GPS location of subscribers 106 which includes the subscribers that are located by GPS (that have not disabled communications of their GPS data back to the content server) within the selected geographical unit, along with the subscribers that are registered to the selected geographical unit. This geographical unit would include both home subscribers and roaming subscribers in step 328 the subscribers forming the ad hoc group are maintained in a list, as will be discussed in more detail below. As long as one subscriber is listed in the list, as determined in step 330, the SMS message is waits in step 332 to send out the SMS message until the SMS is configured. Once the SMS message is configured, as indicated in step 334, the SMS message is sent to each subscriber on the list mentioned above, as indicated in step 336. The system checks in step 338 whether each message was sent successfully. If not, the system writes an error message to an error log, as indicated in step 340. The system continually checks in step 342 whether the SMS message was sent to all subscribers on the list. When the SMS message is sent to the last subscriber on the list, the system writes a message to the message log file indicating that the SMS message was successfully sent to all subscribers on the list in step 344.

FIG. 15 is a flow chart of the web service software running on the content server 102 (FIG. 1) for receiving GPS information for the various mobile communication devices by way of a wireless Internet communication link. The web service application is initiated on power up of the content server 102, as indicated in step 346 and initialized in step 348. The web service application waits for the GPS data from the various mobile communication devices, as indicated in step 350. Upon receipt of the GPS data from the various mobile communication devices, the system checks in step 352 whether the GPS data is valid in step 352. A mapping program, for example, a commercial available program under the trade name Flash Maps, as described above, resident on the content server 102, checks the GPS coordinates received from the various mobile and verifies whether the GPS coordinates fall within any of the geographical units being covered by the system. If the GPS data received from the mobile communication devices is not valid, an error message is written to the error log in step 354 and the system returns to step 346. On the other hand, if the GPS data received is valid, the system determines the current county code of each responding device by its GPS coordinates and mobile communication device ID in step 356. In step 358, the system determines whether a county code corresponds to the received GPS coordinates. If not, the system writes an error message to the error log in step 360. Alternatively, the database 109 is updated with the county code longitude and latitude information in step 362.

Exemplary Screen Shots

Figure 16:
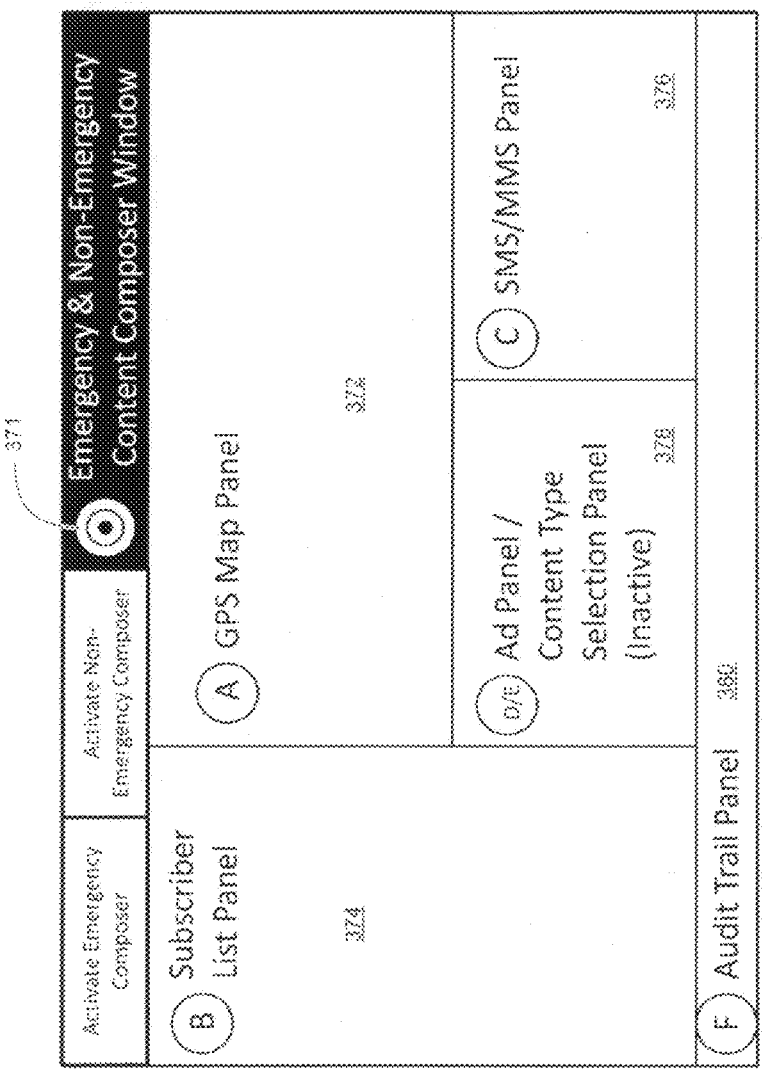
FIGS. 16 and 17 are exemplary web pages of the digital content distribution system illustrated in FIG. 1.
Figure 17:
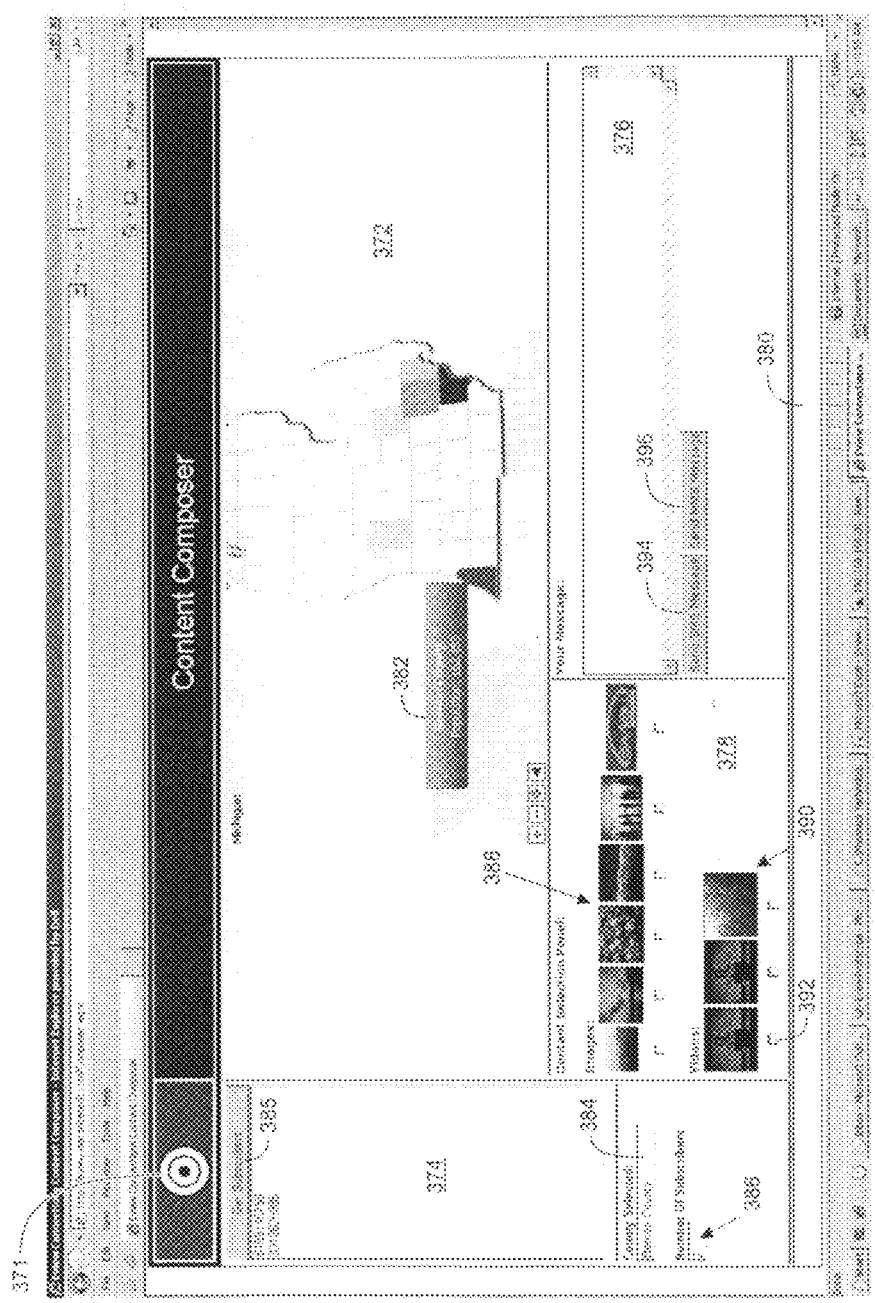

FIGS. 16-17 illustrate exemplary screen shots that act as a graphical user interface for both emergency content and non-emergency content. These figures illustrate an exemplary Content Composer Window, generally identified with the reference numeral 370 for both emergency content and non-emergency content. This Content Composer Window 370 may include a radio button 371 for switching between emergency content and non-emergency content. The Content Composer Window 370 may divided up into various panels, such as a GPS Map Panel 372, a Subscriber List Panel 374, an SMS/MMS Message Panel 376, an optional Ad/Content Panel 378 and an Audit Trail Panel 380.

The user, i.e., content coordinator, selects an area/county to receive content by highlighting the area on the GPS Map Panel 372, for example as .illustrated in FIG. 17. An optional pop-up box 382 may be displayed as a cursor is dragged across the various counties. A mouse click may be used to select and highlight a county over which the cursor is located, As shown in FIG. 17, Berrien County Michigan is highlighted. Once a county is selected, a dialog box 384 on the subscriber list panel is populated with the selected county. Additionally, a "Get Subscribers" button 385 is provided on the Subscriber List Panel 374. Upon selection of the "Get Subscriber" button 385, the Subscriber List Panel 374 is automatically populated with the mobile communication device phone numbers of all Subscribers whose home county code or roaming county code coincide with the selected county code. A dialog box 386 may be provided to identify the number of the subscribers corresponding to the selected county. In addition, the mobile communication device phone numbers are displayed, as indicated. Duplicates may be deleted manually or automatically.

Moreover, as discussed above in connection with FIG. 4, the mobile communication device may be configured so that the subscriber only receives emergency alerts in the geographical area where the subscriber's mobile communication device is located. In other words, if a subscriber is roaming outside the subscriber's home geographical unit, emergency alerts relating to the subscriber's home geographical unit will not be sent to the subscriber when the subscriber is not located in their home geographical unit. Alternatively, the mobile communication device can be configured so that the subscriber receives emergency alerts relative to the subscriber's home geographical unit irrespective of whether the subscriber's mobile communication device is located within the subscriber's home geographical unit.

The Ad/Content panel 378 may be used to upload digital media, generally identified with the reference numeral 388 or videos, generally identified with the reference numeral 390. Each image 388 and video includes a check box, generally identified with the reference numeral 392. These check boxes 392 enable images 388 and/or videos to be included with a message by simply checking the check box 392. Content from third party sources may also be pasted in the SMS/MMS panel 376. Alternatively content, e.g. text, may be created directly in the SMS/MMS panel 376. Once the message is composed, the user simply selects the "Send SMS Message" 394 or the "Send MMS Message" 396. The system is configured to automatically format SMS/MMS messages.

The Audit Trail Panel 380 is used to track message activity and may be used to produce reports showing message activity, as discussed above. More particularly, each time a message is sent out, the Audit Trail Panel 380 indicates whether or not the message was successfully sent out.

Operation

Figure 18:
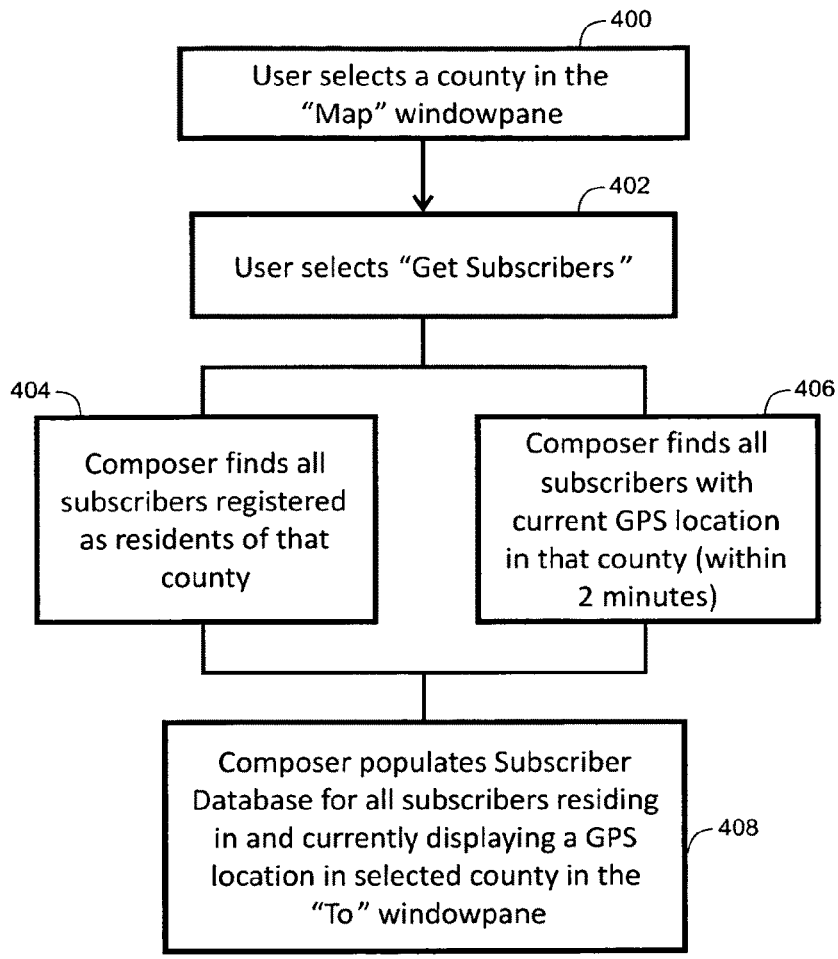
FIGS. 18-23 are high level flow charts illustrating the operation of the digital content distribution system illustrated in FIG. 1.

FIGS. 18-23 illustrate the operation of the system. FIG. 18 illustrates operation of the system in determining the members of the ad hoc group of subscribers in a selected county in a given time period. Referring first to FIG. 18, in step 400; the user initially selects a county in the GPS Map Panel 372. Next in step, 402 the user selects the "Get Subscribers" button 385 on the Subscriber List Panel 374. The system locates all subscribers registered as residents in the selected county in step 404. The system also locates all subscribers within the selected county based on the current GPS location of those subscribers in step 406. In step 408 the subscriber database is used to populate the subscriber phone numbers in the Subscriber List panel 374.

Figure 19:
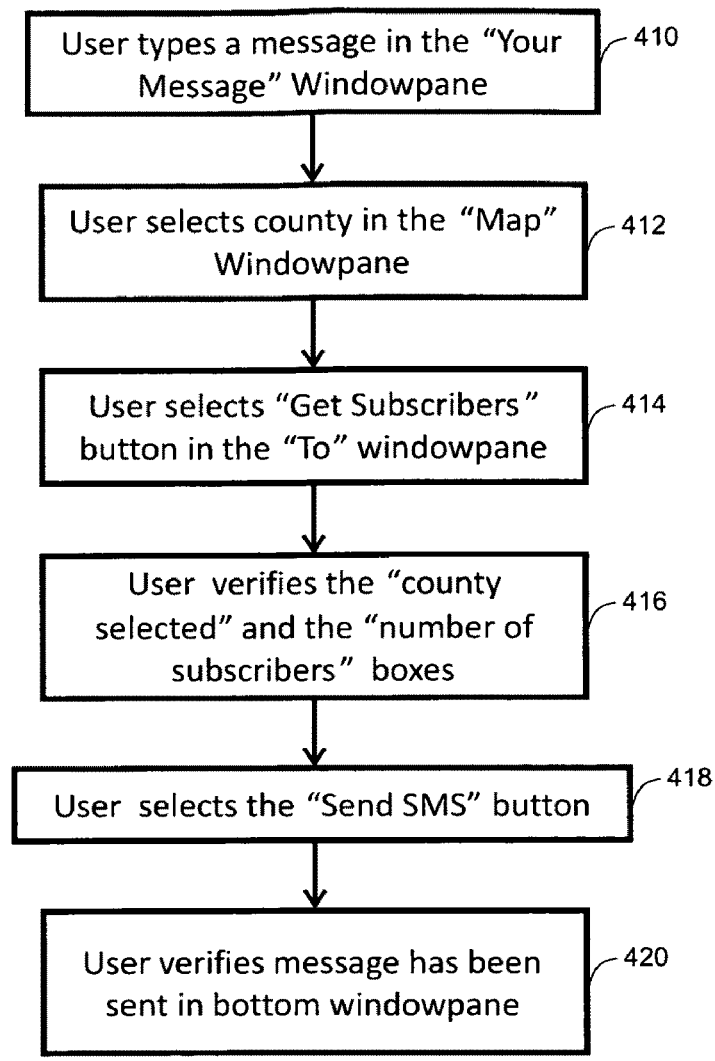

FIG. 19 illustrates operation of the system in sending out messages, whether SMS or MMS and emergency and non-emergency. In step 410, the user composes an SMS or MMS message in the SMS/MMS panel 376. Next in step 412, the user selects a county of interest in the GPS Map Panel 372. Next in step 414, the user selects the "Get Subscribers" button 385 in the Subscriber List Panel 374. The user may verify the selected county by review of the dialog box 384 in the Subscriber List Panel 374 in step 416. In order to send out a message to the subscribers listed in the Subscriber List Panel 374, the user simply selects the "Send SMS Message" button 394 or the "Send MMS Message" button 396 in step 418. In step 420, the user verifies that the message was properly sent by reviewing the message in the Audit Trail Window 380.

Figure 20:
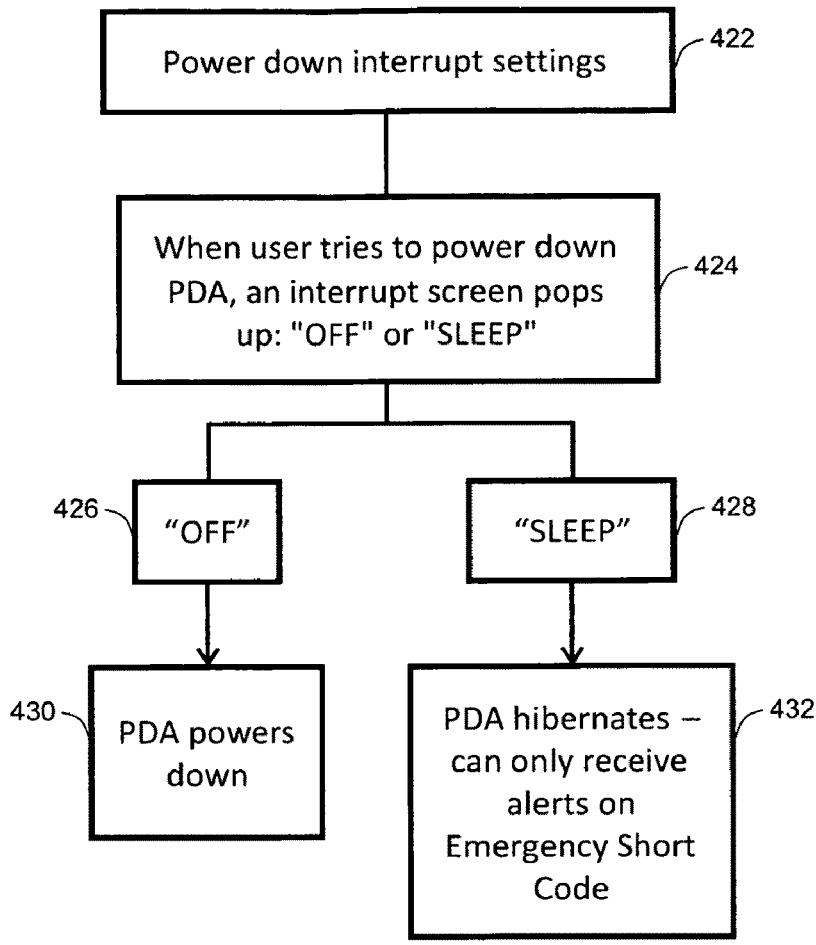

FIG. 20 illustrates exemplary operation of the mobile communication device in response to a subscriber attempting to power down the device. The mobile communication device is configured to generate an interrupt message any time the user attempts to power down the system, for example by turning the device off, as indicated in steps 422 and 424. In response to the interrupt, the user is requested to confirm the off mode, as indicated in step 426 or to select a sleep mode as indicated in step 428. If the user confirms the off mode, the mobile communication device is powered down, as indicated in step 430. Alternatively, if the user selects a sleep mode, the mobile communication device is placed in a low power mode and can still receive emergency alerts, as indicated in step 432.

Figure 21:
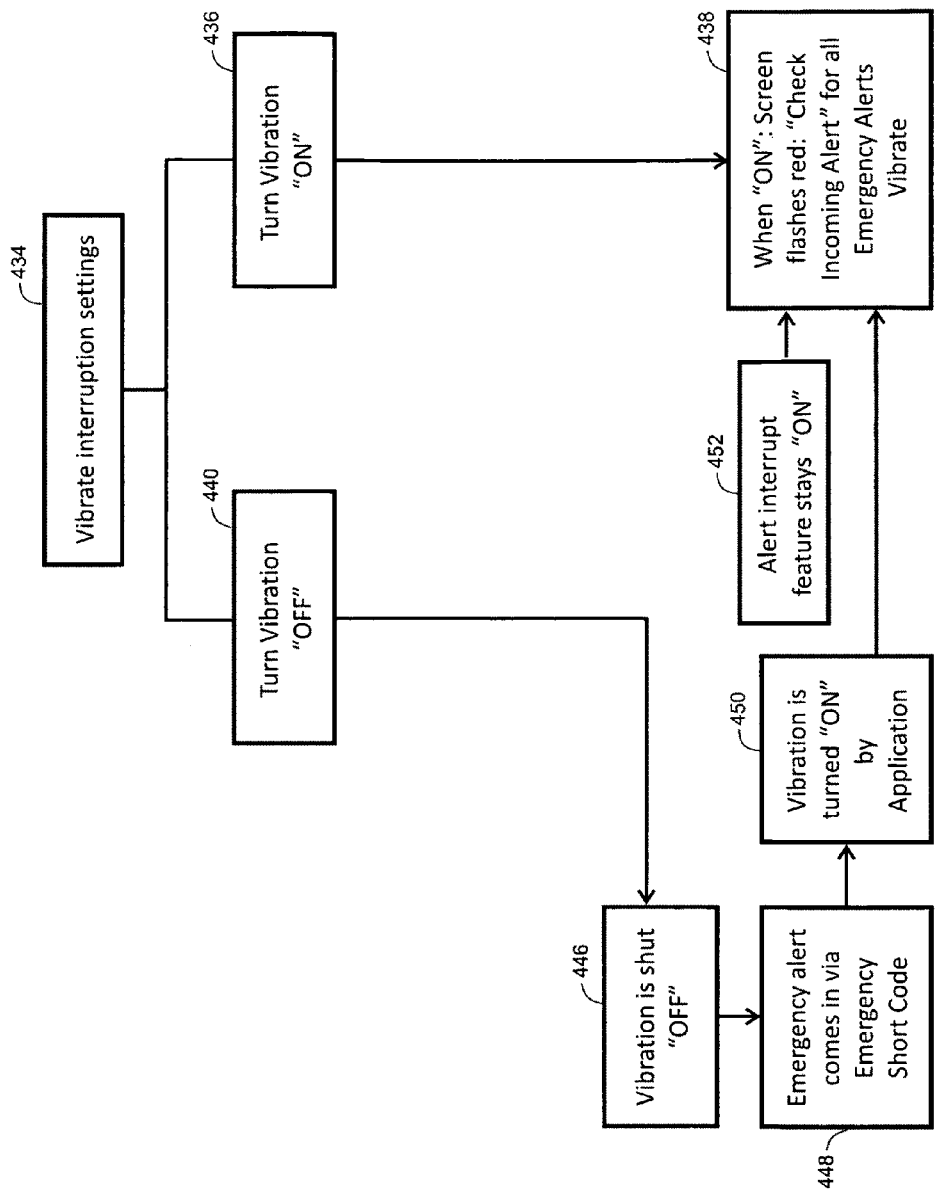
Figure 22:
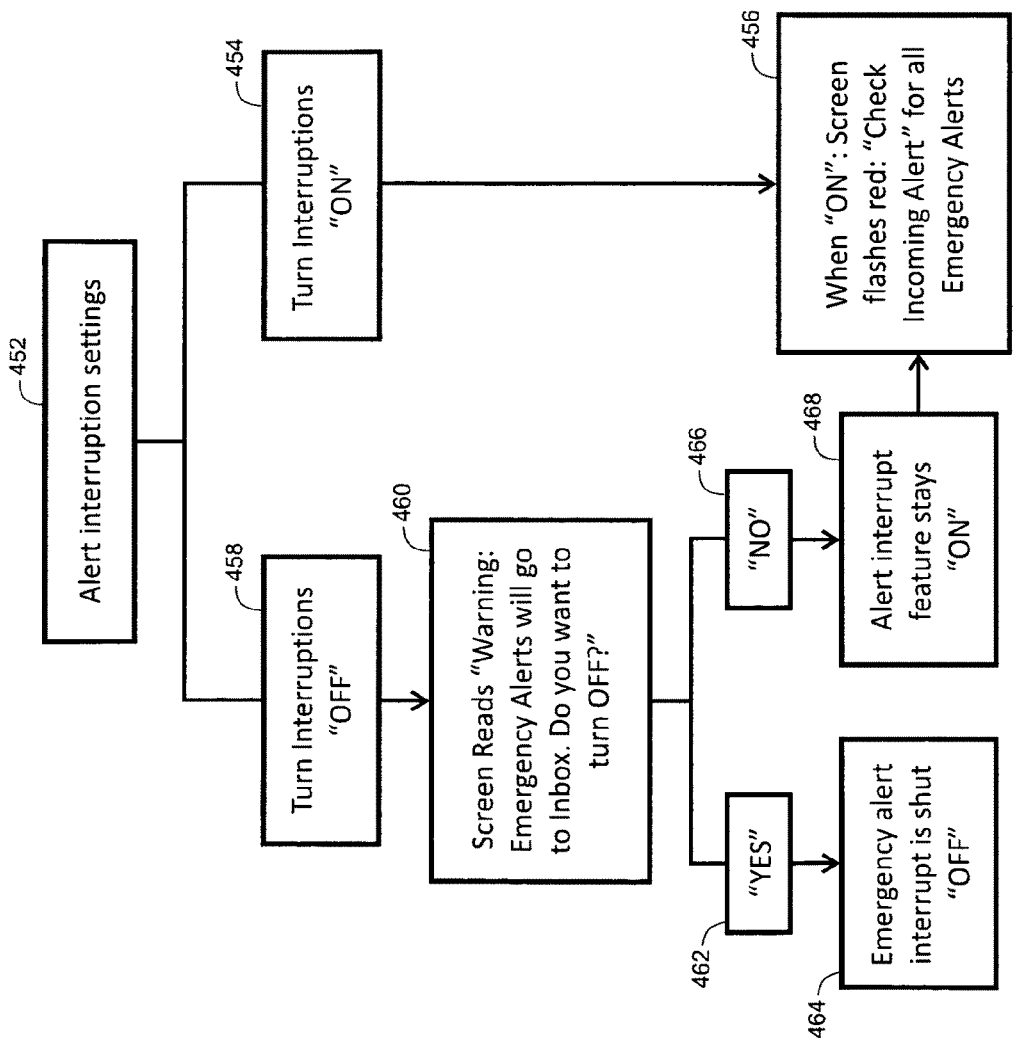

FIG. 21 illustrates an emergency alert interrupt feature in accordance with important aspects of the invention. More particularly, FIG. 21 illustrates an important aspect of the invention which causes the mobile communication device to vibrate in response to an emergency alert even though vibrate function of the mobile communication device has been turned off. FIG. 22 illustrates an emergency alert configuration setting of the mobile communication device. Referring first to FIG. 21, in accordance with an important aspect of the invention, the emergency alert function will cause the mobile communication device to vibrate whether the vibrate function is on or not. More particularly, initially, as indicated in step 434, the subscriber has an option to configure the mobile communication device and either enable or disable the vibrate function of the mobile communication device. Such a configuration setting is conventionally available on known mobile communication devices. If the user turns the vibrate function on, as indicated in step 436, the display on the mobile communication device will vibrate and flash red and a message "Check for Incoming Alert" will be displayed, as indicated in step 438 in response to an incoming Emergency Alert.

As indicated in step 440, the subscriber may configure the mobile communication device so that the vibration function is turned off. Such action causes the vibrate feature to be turned off, as indicated in step 446. Even though the vibration feature is turned off, emergency alerts are still received by the mobile communication device, as indicated in step 448. More particularly, the system is able to distinguish emergency content from a non-emergency content in response to the last status of the radio button 371 (FIG. 16). If the last selection of the radio button 371 indicates that the message is an emergency alert, the system sends the mobile communication devices an "Emergency Short Code" as indicated in step 448. In accordance with an important feature of the invention, the vibration feature of the mobile communication device is turned on, as indicated in step 450 in response to emergency content as long as the mobile communication device has not been configured to disable such emergency alerts, as indicated in step 452 and discussed in connection with FIG. 3B.

Referring to FIG. 22, as discussed above, the emergency alert interrupt feature can be turned on or off by the subscriber, represented as step 452. If the emergency alert interrupt feature is turned ON, as indicated in step 454, the emergency alert will interrupt any application in use on the mobile communication device. With the emergency alert function ON, an emergency alert will not only interrupt any task currently running on the mobile communication device but also cause the mobile communication device to vibrate even if the vibrate feature is turned off, as discussed above. An emergency alert will also cause the display on the mobile communication device to flash red and a warning for the subscriber to check for an incoming emergency alert, as indicated in step 456.

Alternatively, if the subscriber turns the emergency alert interrupt feature OFF, as indicated in step 458, the system causes the following warning to be displayed: "Warning: Emergency Alerts will go to inbox. Do you want to turn off?", as indicated in step 460.

If the subscriber confirms that the Emergency Alerts are to be turned OFF, as indicated in step 462, the Emergency Alert function is turned off in step 464. Alternatively, if the subscriber does not confirm that the Emergency Alerts are to be turned off, as indicated in step 466, the emergency alert interrupt feature is enabled, as indicated in step 468.

Figure 23:
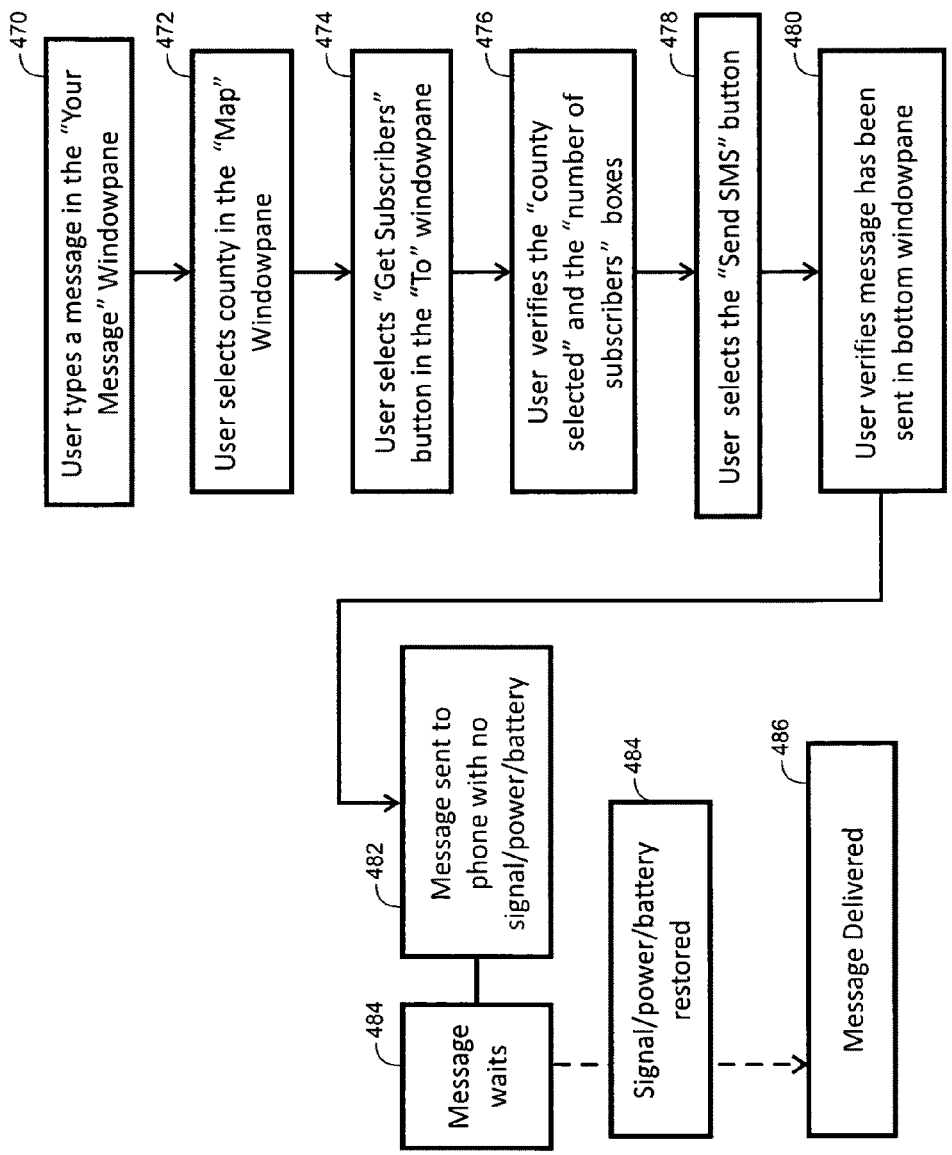

FIG. 23 illustrates operation of the system during a condition in which a mobile communication device has no battery or low power. In step 470, the content composer composes an SMS or MMS message in the SMS/MMS panel 376. Next in step 472, the user selects a county of interest in the GPS Map Panel 372. Next in step 474, the user selects the "Get Subscribers" button 385 in the Subscriber List Panel 374. The user may verify the selected county by review of the dialog box 384 in the Subscriber List Panel 374 in step 476. In order to send out a message to the subscribers listed in the Subscriber List Panel 374, the user simply selects the "Send SMS Message" button 394 or the "Send MMS Message" button 396 in step 478. In step 480, the user verifies that the message was properly sent by reviewing the message in the Audit Trail Window 380. If the message was sent to a mobile communication device with no battery or low battery power or no signal, as indicated in step 482, the message waits, as indicated in step 484 until the battery, power or signal is restored to the mobile communication device, as indicated in step 484. During the waiting period, the cellular phone carrier queues the message on their system until the subscriber signal or power is restored, as indicated in step 484. Once the power, signal or battery is restored, the message is delivered to the mobile communication device, as indicated in step 486.

Obviously, many modifications and variations of the present invention are possible in light of the above teachings. Thus, it is to be understood that, within the scope of the appended claims, the invention may be practiced otherwise than as specifically described above.

What is claimed and desired to be secured by a Letters Patent of the United States is:

We claim:

1. A content distribution system for providing location sensitive digital content to deaf or hard of hearing subscribers having cellular communication devices over a public communications network, the system comprising:

a work station that transmits digital content to an emergency content server, wherein said work station is programmed to enable said digital content to be received over the Internet and wherein said work station is programmed to enable editing of said digital content;

a persistent storage device that stores deaf or hard of hearing subscriber information in a database including a home location for each of said cellular communication device subscribers and includes subscriber preferences as to emergency and non-emergency information, wherein the database is independent of any cellular network;

an emergency content server, independent of any cellular network, that tracks the location of subscribers that are deaf or hard of hearing coupled to said persistent storage device and said work station, the content server comprising:

a first subsystem that automatically receives and stores on an on-going basis global positioning system (GPS) signals from the cellular communication devices for deaf or hard of hearing subscribers stored in said database, said first subsystem determines which of the subscribers are located in a specific geographic area at a predetermined point in time based upon said GPS signals and generates a list of deaf or hard of hearing subscribers within said specific geographic area at said predetermined point in time; and a second subsystem that receives said emergency and non-emergency digital content related to a specific geographic area from said work station;

an aggregator that receives said list of deaf or hard of hearing subscribers in said specific geographic area from said first subsystem and sends said emergency and non-emergency digital content to said subscribers on said list over a public cellular communication network; and said cellular communication devices which each include a global positioning system (GPS), each of said cellular communication devices automatically and repeatedly receive the GPS data representative of the current location of said cellular communication device and report their respective GPS location representative data to said emergency content server; said cellular communication devices also receive emergency and non-emergency digital content from said content server and determine whether said digital content from said content server is emergency or non-emergency digital content; said cellular communication devices being further programmed to interrupt any existing tasks being handled by the cellular communication device and indicate said emergency content when said digital content is determined to be emergency digital content, said cellular communication devices being further configured to wake from a sleep mode and vibrate and display said emergency content.

2. The system as recited in claim 1, wherein said cellular communication devices are programmed to display said emergency digital content anytime said emergency digital content is received by said mobile communication device.

3. The system as recited in claim 1, wherein said content is a SMS message.

4. The system as recited in claim 1, wherein said content is a MMS message.

5. The content server system as recited in claim 1, further including a system for enabling messages to be sent to said cellular communication devices in said specific geographic area.

* * * * *